United States Patent
Suzuki et al.

[19]

[11] Patent Number: 6,021,186
[45] Date of Patent: Feb. 1, 2000

[54] AUTOMATIC CAPTURE AND PROCESSING OF FACSIMILE TRANSMISSIONS

[75] Inventors: Kiyoshi Suzuki, Tokyo, Japan; Michael A. Baxter, Sunnyvale; Jonathan J. Hull, San Carlos, both of Calif.

[73] Assignee: Ricoh Company Ltd., Tokyo, Japan

[21] Appl. No.: 08/970,190

[22] Filed: Nov. 14, 1997

Related U.S. Application Data

[63] Continuation-in-part of application No. 08/423,560, Apr. 17, 1995, Pat. No. 5,794,062.

[51] Int. Cl.[7] .................................................. H04M 11/00
[52] U.S. Cl. .................................. 379/100.12; 379/93.29; 358/468
[58] Field of Search .......................... 379/100.01, 100.02, 379/100.03, 100.05, 100.12–100.17, 110.01, 93.01, 93.05–93.08, 93.14–93.17, 93.28–93.34, 90.01; 358/400, 402, 403, 406, 407, 434, 442, 444, 468

[56] References Cited

U.S. PATENT DOCUMENTS

| | | | |
|---|---|---|---|
| 5,163,088 | 11/1992 | LoCascio | 379/95 |
| 5,553,116 | 9/1996 | Avni | 379/34 |
| 5,568,280 | 10/1996 | Wells et al. | 358/468 |
| 5,572,572 | 11/1996 | Kawan et al. | 379/90.01 |
| 5,617,221 | 4/1997 | DeVries et al. | 358/442 |

FOREIGN PATENT DOCUMENTS 19614991  10/1996  Germany.

*Primary Examiner*—Wing F. Chan
*Attorney, Agent, or Firm*—Fenwick & West LLP

[57] ABSTRACT

An automatic capture device, situated between a telephone line and a fax machine, provides real-time monitoring, recording, and selective modification of fax transmissions, and forwarding of the fax data to a computer interface. The automatic capture device is dynamically reconfigurable, capable of adaptation to a variety of facsimile formats and computer interfaces.

26 Claims, 23 Drawing Sheets

AUTOMATIC CAPTURE AND PROCESSING OF FACSIMILE TRANSMISSIONS

The present invention is a continuation-in-part of U.S. patent application Ser. No. 08/423,560, filed Apr. 17, 1995, entitled "System and Method for Dynamically Reconfigurable Computing Using a Processing Unit Having Changeable Internal Hardware Organization", now U.S. Pat. No. 5,794,062, the subject matter of which is incorporated by reference.

BACKGROUND OF THE INVENTION

1. Field of the Invention

The present invention relates to a facsimile capture device, and more particularly, to a dynamically reconfigurable device capable of automatically monitoring, recording, and optionally modifying fax transmissions between two fax machines connected through a telephone line.

2. Description of the Background Art

In recent years, the cost of computer memory and permanent storage has dramatically decreased, while the cost of storing paper documents has increased. It is now less expensive to retain electronic copies of documents than their physical counterparts. Electronic document storage promises not only reduced costs, but also other desirable benefits such as rapid retrieval, high-speed searching, and simplified format conversions.

However, one problem that has slowed the evolution to electronic document storage is the inconvenience associated with capturing the document in electronic form. Because most fax machines do not automatically capture and retain a digital copy of a fax document, a human operator must pass the document through a separate scanning device, such as a flatbed scanner, in order to obtain the digital copy. Not only does this extra step waste time, but it may also lead to gaps in the digital record if the responsible party neglects to scan the document. If a system were developed to automatically capture documents without human interaction, then a complete digital record would be assured. In a corporate environment, such a record would be invaluable from a security standpoint, with the added benefit that human resources would be freed for more productive tasks.

Although capture circuitry could be integrated into fax machines in order to automatically capture transmitted documents, a costly upgrade would be needed for existing fax machines. Indeed, upgrades may be difficult or impossible with most devices. Moreover, such integrated machines would probably require a hardware upgrade in order to accommodate different facsimile protocols or computer interfaces. What is needed, then, is a device that can monitor and record fax transmissions without requiring an expensive modification of existing hardware.

Various solutions have been proposed for addressing this problem. For example, U.S. Pat. No. 5,617,221 discloses a fax modem that passively records any transmissions to or from a fax machine. However, such an approach has several drawbacks. First, the system is implemented using a digital signal processor ("DSP") and a specific computer interface. This static design has the disadvantage that it cannot be dynamically adapted to different interfaces or facsimile formats. Additionally, there is no mechanism for modifying outgoing or incoming facsimile transmissions, such as by providing encryption or compression. Indeed, a DSP is ill-suited for performing any kind of symbolic computations on facsimile data.

Thus, there remains a need for a facsimile device that is capable of monitoring, recording, and optionally modifying fax transmissions that take place between two fax machines connected through a telephone line. Moreover, there remains a need for a dynamically reconfigurable facsimile device that can accommodate a wide variety of interfaces and facsimile formats. Additionally, there remains a need for a dynamically reconfigurable facsimile device that can modify outgoing or incoming transmissions, such as by providing encryption and compression.

SUMMARY OF THE INVENTION

The present invention solves the foregoing problems by automatically capturing facsimile documents without requiring an expensive upgrade to existing hardware. Moreover, the present invention offers a highly flexible system capable of dynamically re-configuring itself to a variety of contexts. In accordance with the present invention, this is accomplished by providing an automatic capture device, situated between a telephone line and a fax machine. The automatic capture device is capable of real-time monitoring, recording, and selectively modifying fax transmissions, and forwarding the fax data to a computer interface.

In one aspect of the invention, the automatic capture device includes a high impedance transformer for receiving a facsimile transmission without altering the transmission, a codec for demodulating the analog signal and producing a stream of digital data, and a dynamically reconfigurable computer for decoding and processing the digital data, and forwarding the data to a computer interface.

In another aspect of the invention, the dynamically reconfigurable computer comprises a dynamically reconfigurable processing unit coupled to a random access memory, an programmable read-only memory, and a time base unit.

DETAILED DESCRIPTION OF THE PREFERRED EMBODIMENTS

Figure 1:
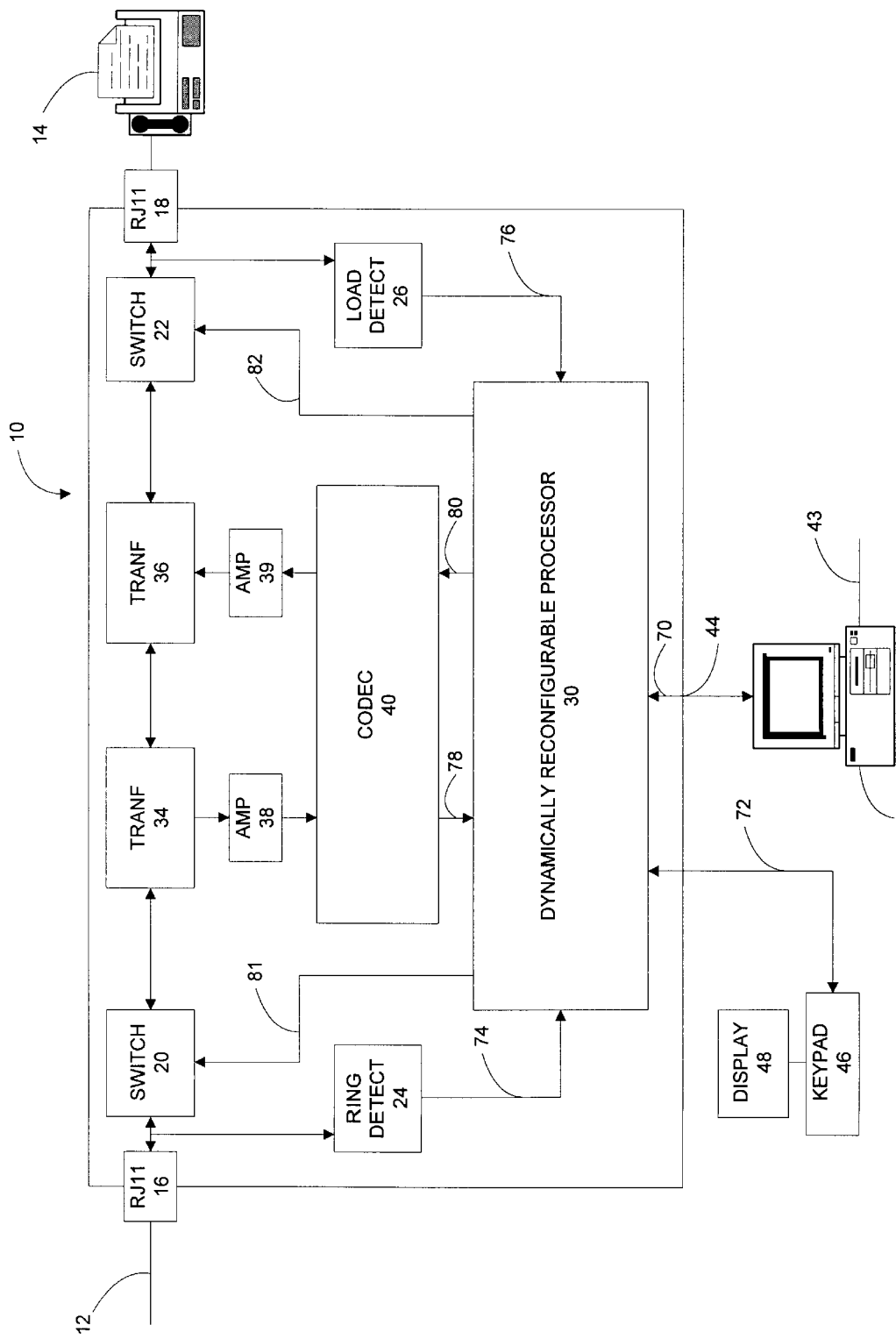
FIG. 1 is a block diagram of a preferred embodiment of an automatic capture device in accordance with the present invention.

Referring now to FIG. 1, there is shown a block diagram of an automatic capture device 10 in accordance with the present invention. In a preferred embodiment, automatic capture device 10 operates in two different modes. In the first mode, automatic capture device 10 passively monitors incoming and outgoing fax messages from a fax machine 14 without interfering with the messages. In the second mode, automatic capture device 10 modifies the messages by intercepting the transmission, processing the data, and forwarding the data to a destination fax machine. Throughout this description, an "incoming" facsimile transmission is one directed toward fax machine 14; an "outgoing" transmission is one generated by fax machine 14.

As illustrated in FIG. 1, a telephone line 12 and the fax machine 14 are connected to automatic capture device 10 through two connectors 16, 18. Both connectors are preferably RJ-11 connectors and are well known in the art. Connectors 16, 18 are coupled to switches 20, 22, respectively. Switches 20, 22 are preferably solid state digital switching relays, and are single-pole-single-throw ("SPST"), but may be any suitable switches. In monitor mode, switches 20, 22 connect the first and second connectors 16, 18 via two transformers 34, 36, allowing fax machine 14 to send and receive fax messages through telephone line 12. In modify mode, switches 20, 22 disconnect either telephone line 12 or fax machine 14 from automatic capture device 10, allowing device 10 to intercept an incoming or outgoing call.

Coupled to connector 16 is a ring detector 24. Ring detectors for detecting a standard ring signal are well known in the art. When a ring signal is detected on telephone line 12, ring detector 24 signals an dynamically reconfigurable computer 30 so that appropriate action will be taken. The features and operation of dynamically reconfigurable computer 30 will be described in greater detail below. Similarly, coupled to connector 18 is a load detector 26. Load detectors for detecting a current on a line are also well known in the art. When a current is detected from fax machine 14, load detector 26 signals dynamically reconfigurable computer 30 so that appropriate action will be taken.

Switches 20, 22 are coupled to transformers 34, 36. Transformer 34 has a high impedance, preferably on the order of 50 kΩ, and is used by automatic capture device 10 to passively monitor transmissions to and from fax machine 14. Transformer 36 has a standard telephone line impedance of approximately 600 Ω, and is used for transmitting data to telephone line 12 and fax machine 14 while operating in modify mode. Alternatively, one skilled in the art will recognize that both transformers could have a 600 Ω impedence in order to minimize reactive losses in passive power division.

Transformer 34 is connected to an amplifier 38, which amplifies the low current signal produced by high impedance transformer 34. Amplifier 38 is preferably a Maxim Semiconductor MAX495 amplifier, but could be any suitable amplifier. The output of amplifier 38 is connected to a first input of a codec 40 having a telephony grade frequency response. Codec 40 is preferably a National Semiconductor TP3501 codec, and is capable of demodulating the amplified signal and providing a stream of digital data to an input of dynamically reconfigurable computer 30.

Dynamically reconfigurable computer 30 is also coupled to a second input of codec 40, which is capable of modulating a digital signal from dynamically reconfigurable computer 30 into an analog signal. The analog signal is then fed into an amplifier 39, which is capable of driving low impedence transformer 36. Amplifier 39 is preferably a Maxim Semiconductor MAX473 amplifier, but could be any suitable amplifier. The output of amplifier 39 is coupled to transformer 36, which is capable of generating a telephone grade signal to telephone line 12 or fax machine 14.

In a preferred embodiment, dynamically reconfigurable computer 30 is connected to a remote computer 42 by an interface 44. Computer 42 is preferably an IBM-PC® compatible computer, and includes a mass storage device such as a hard disk, magneto-optical drive, DVD, RAID or other storage system for recording the fax data received by automatic capture device 10. Alternatively, computer 42 may be connected to a network 43, such as an ethernet, which includes an attached file server or other device for storing fax data. Interface 44 is preferably a conventional RS-232 serial port if automatic capture device 10 is implemented as an external device. Alternatively, interface 44 may simulate a serial port if automatic capture device 10 is implemented as a card within a personal computer. One skilled in the art will recognize, however, that a variety of computers and interfaces are possible without departing from the spirit of the invention.

In a preferred embodiment, dynamically reconfigurable computer 30 is also coupled to a keypad 46, preferably comprising a display unit 48 for interacting with the user. Keypad 46 and associated display unit 48 may be implemented by any of a number of standard devices, such as a standard 101 key keyboard, a 10 key numeric keypad, or a number of other keypads. Keypad 46 is used for a variety of purposes, such as selectively activating utility or diagnostic programs, selectively changing operational modes, and entering encryption keys and fax routing information.

While automatic capture device 10 is in monitor mode, fax machine 14 is either sending or receiving a fax message. For example, when fax machine 14 is receiving a fax transmission, automatic capture device 10 receives the analog signals from telephone line 12. Most of the analog signal is transmitted along telephone line 12, through connector 16, switch 20, transformers 34, 36, switch 22, and connector 18, to fax machine 14. However, a small portion of the signal is diverted by high impedance transformer 34 and amplified by amplifier 38. The amplified signal is demodulated by codec 40 and sent to dynamically reconfigurable computer 30. Dynamically reconfigurable computer 30 then forwards the page data to computer 42 via interface 44.

In modify mode, automatic capture device 10 intercepts a call to or from fax machine 14. For example, when an incoming call is detected on line 12 by ring detector 24, fax machine 14 is disconnected from automatic capture device 10 by opening switch 22. Thereafter, dynamically reconfigurable computer 30, by controlling codec 40 and low-impedance transformer 36, answers the incoming call and receives the fax transmission as would a standard fax modem. A more detailed description of this process is provided below. In a preferred embodiment, the entire transmission is received by automatic capture device 10 and stored inside dynamically reconfigurable computer 30 before the data is forwarded to the local fax machine 14.

When the fax transmission is complete, dynamically reconfigurable computer 30 decrypts and/or decompresses the received pages. Switch 22 is then closed, reconnecting fax machine 14 to automatic capture device 10. Thereafter, automatic capture device 10 sends the stored page data to computer 42 for archival. Finally, automatic capture device 10 sends the page data to fax machine 14. This is accomplished by disconnecting outgoing line 12 by opening switch 20, and transmitting a ring signal to fax machine 14. When fax machine 14 answers, automatic capture device 10 establishes a standard CCITT facsimile connection and transmits the data using conventional protocols.

When an outgoing call is detected from fax machine 14 by load detector 26, the telephone number of the remote fax machine is captured and stored by dynamically reconfigurable computer 30, preferably in RAM 52. Line 12 is then disconnected from automatic capture device 10 by opening switch 20. Thereafter, dynamically reconfigurable computer 30, by controlling codec 40 and low-impedance transformer 36, answers the outgoing call and receives the fax transmission as would a standard fax modem. A more detailed description of this process is described below. In a preferred embodiment, the entire transmission is received by automatic capture device 10 and stored inside dynamically reconfigurable computer 30 before the data is forwarded to the remote fax machine.

When the fax transmission is complete, dynamically reconfigurable computer 30 selectively encrypts and/or compresses the received pages. Switch 20 is then closed, reconnecting line 12 to automatic capture device 10. Thereafter, automatic capture device 10 sends the stored page data to computer 42 for archival. Finally, automatic capture device 10 sends the page data to the remote fax machine. This is accomplished by disconnecting fax machine 14 from automatic capture device 10 by opening switch 22, and dialing the stored telephone number of the remote fax machine. When the remote fax machine answers, automatic capture device 10 establishes a standard CCITT facsimile connection and transmits the data using conventional protocols.

Dynamically reconfigurable computer 30 is preferably implemented as an S-machine as described in U.S. patent application Ser. No. 08/423,560, entitled "System and Method for Scalable, Parallel, Dynamic Reconfigurable Computing," the subject matter of which is incorporated herein by reference. However, those skilled in the art will realize that additional I/O logic circuits are included so as to couple external peripheral circuitry such as those depicted in FIGS. 2 and 3 to the core dynamically reconfigurable logic described in the referenced application.

An S-machine is a computer having a processing unit that can be selectively reconfigured during the execution of program instructions to implement a number of different instruction set architectures ("ISAs"). Each ISA is a primitive or core set of instructions that can be used to program the S-machine. An ISA defines instruction formats, opcodes, data formats, addressing modes, execution control flags, and program-accessible registers. In a preferred embodiment, each ISA is optimized for executing instructions related to a particular class of operations. For example, the compute engine ISA of the present invention includes optimized instructions for encryption and compression.

Figure 2:
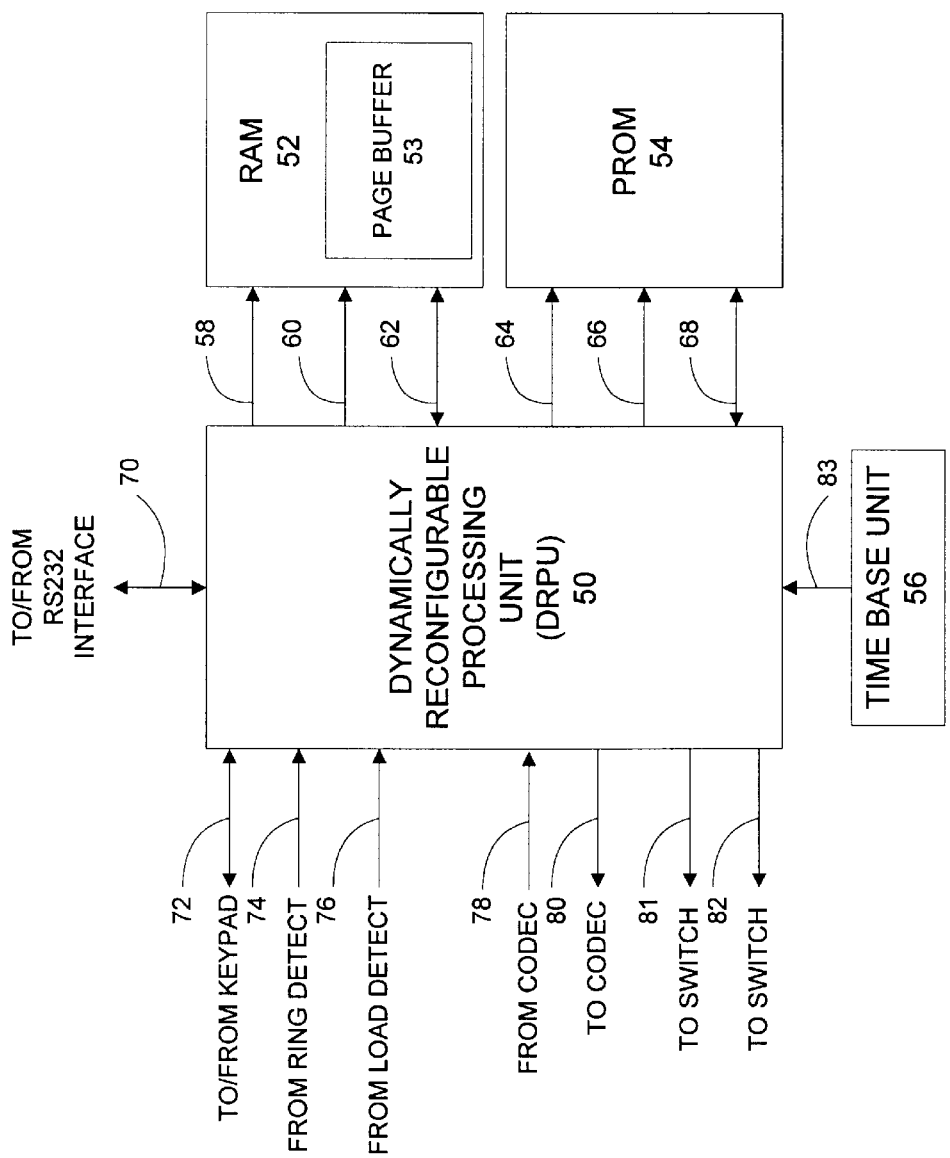
FIG. 2 is a block diagram of an dynamically reconfigurable computer in accordance with the present invention.

Referring now to FIG. 2, there is shown a block diagram of an dynamically reconfigurable computer 30 in accordance with the present invention. Dynamically reconfigurable computer 30 preferably comprises a dynamically reconfigurable processing unit ("DRPU") 50 coupled to a random access memory ("RAM") 52, a programmable read-only memory ("PROM") 54, and a time base unit 56. The features and benefits of DRPU 50 will be described in greater detail below. However, RAM 52 is a Toshiba TC554616 or similar device, having a capacity of 256K×16. Allocated within RAM 52 is a page buffer 53, which is used for storing fax data. In a preferred embodiment, PROM 54 is a standard memory device, which might be implemented in either flash or electrically eraseable ("EE") technology. A suitable flash device is an Advanced Micro Device Am28F020, which has 256K×8 capacity. Time base unit 56 is preferably a standard clock oscillator such as those manufactured by Crystek, Fox, or Saronix.

DRPU 50 has a control signal output coupled to a control signal input of RAM 52 via a memory control line 58; an address output coupled to an address input of RAM 52 via an address line 60; and a bi-directional data port coupled to a bi-directional data port of the RAM 52 via a memory I/O line 62. Similarly, DRPU 50 has a control signal output coupled to a control signal input of PROM 56 via a memory control line 64; an address output coupled to an address input of PROM 56 via an address line 66; and a bi-directional data port coupled to a bi-directional data port of the PROM 54 via a memory I/O line 68. DRPU 50 additionally includes a bi-directional data port coupled to an RS232 interface via line 70; a bi-directional data port coupled via line 72 to keypad 46 and associated display unit 48; a control signal input 74 coupled to ring detector 24; a control signal input 76 coupled to load detector 26; a data input port coupled to codec 40 via line 78; a data output port coupled to codec 40 via line 80; and control signal outputs 81, 82, coupled to switches 20, 22, respectively. Time base unit 56 is coupled to DRPU 50 via a timing signal line 83.

DRPU 50 is preferably implemented as a reconfigurable logic device such as a Xilinx XC5000 Field Programmable Gate Array ("FPGA"). The reprogrammable logic device provides a plurality of selectively configurable logic blocks ("CLBs"), I/O blocks ("IOBs"), interconnect structures, data storage resources, tri-state buffer resources, and wired-logic capabilities. Each CLB preferably includes selectively-reconfigurable circuitry for generating logic functions, storing data, and routing signals. Each IOB includes reconfigurable circuitry for transferring data between a CLB and an FPGA I/O pin. DRPU 50 also comprises a configuration data set that defines the hardware configuration or architecture by specifying functions performed within the CLBs, as well as interconnections within and between CLBs and IOBs. Each configuration data set also defines reconfiguration logic capable of reconfiguring the FPGA responsive to a reconfiguration directive.

Figure 3:
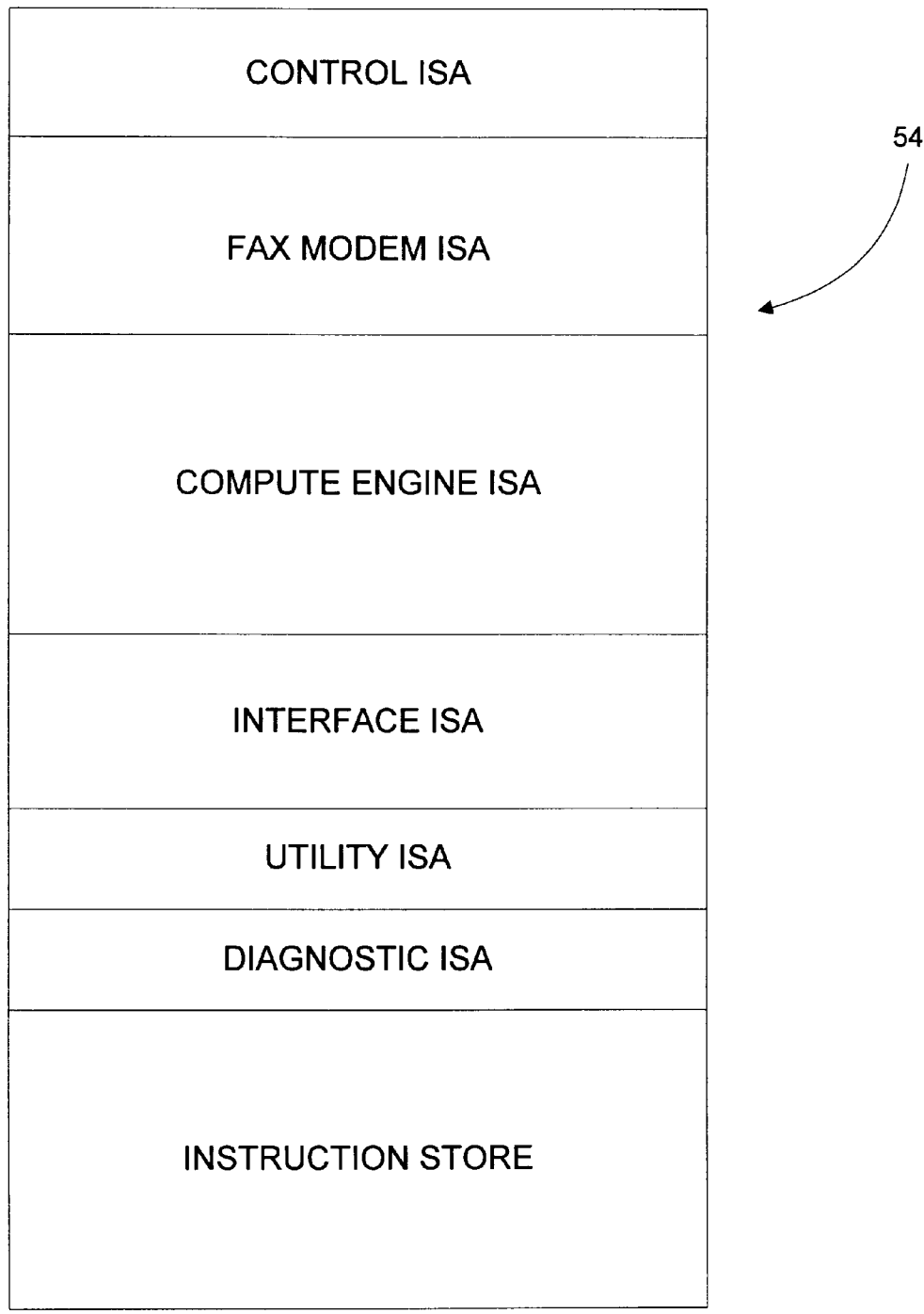
FIG. 3 is a diagram showing an exemplary allocation of PROM resources between the configuration sets for various instruction set architectures ("ISAs") and the instruction store in accordance with the present invention.

In a preferred embodiment, PROM 54 stores program instructions for DRPU 50. In addition, PROM 54 stores a number of configuration data sets which specify a DRPU hardware organization optimized for the implementation of a corresponding ISA. FIG. 3 illustrates an exemplary allocation of PROM resources between the various configuration sets and the instruction store. In a preferred embodiment, PROM 54 stores a configuration data set for the following instruction set architectures: (1) control, (2) fax modem, (3) compute engine, (4) interface, (5) utility, and (6) diagnostic. Since PROM 54 stores the configuration data sets defining the DRPU hardware organization, automatic capture device 10 may be easily reconfigured to accommodate a wide variety of facsimile formats and computer interfaces by flash upgrading the PROM. Thus, automatic capture device 10 does not suffer from the deficiencies of the prior art brought about by static implementation logic.

Program instructions stored in PROM 54 selectively include one or more reconfiguration directives, where each reconfiguration directive references a configuration data set. During execution of the instructions by DRPU 50, one or more reconfiguration directives may be selected. Selecting a given reconfiguration directive results in a reconfiguration of DRPU hardware according to the configuration data set referenced by the reconfiguration directive. Upon selection of a reconfiguration directive, the DRPU hardware is reconfigured to provide an optimized implementation of a particular ISA. This is accomplished by transferring the corresponding configuration data set from PROM 54 to the FPGA within DRPU 50, and initiating the FPGA reconfiguration procedure. In a preferred embodiment, DRPU 50 can be rapidly runtime-configured to directly implement multiple ISAs upon encountering a reconfiguration directive. For example, reconfiguration is possible using the Express Mode feature of the Xilinx XC5000 device in under 500 microseconds.

Figure 4:
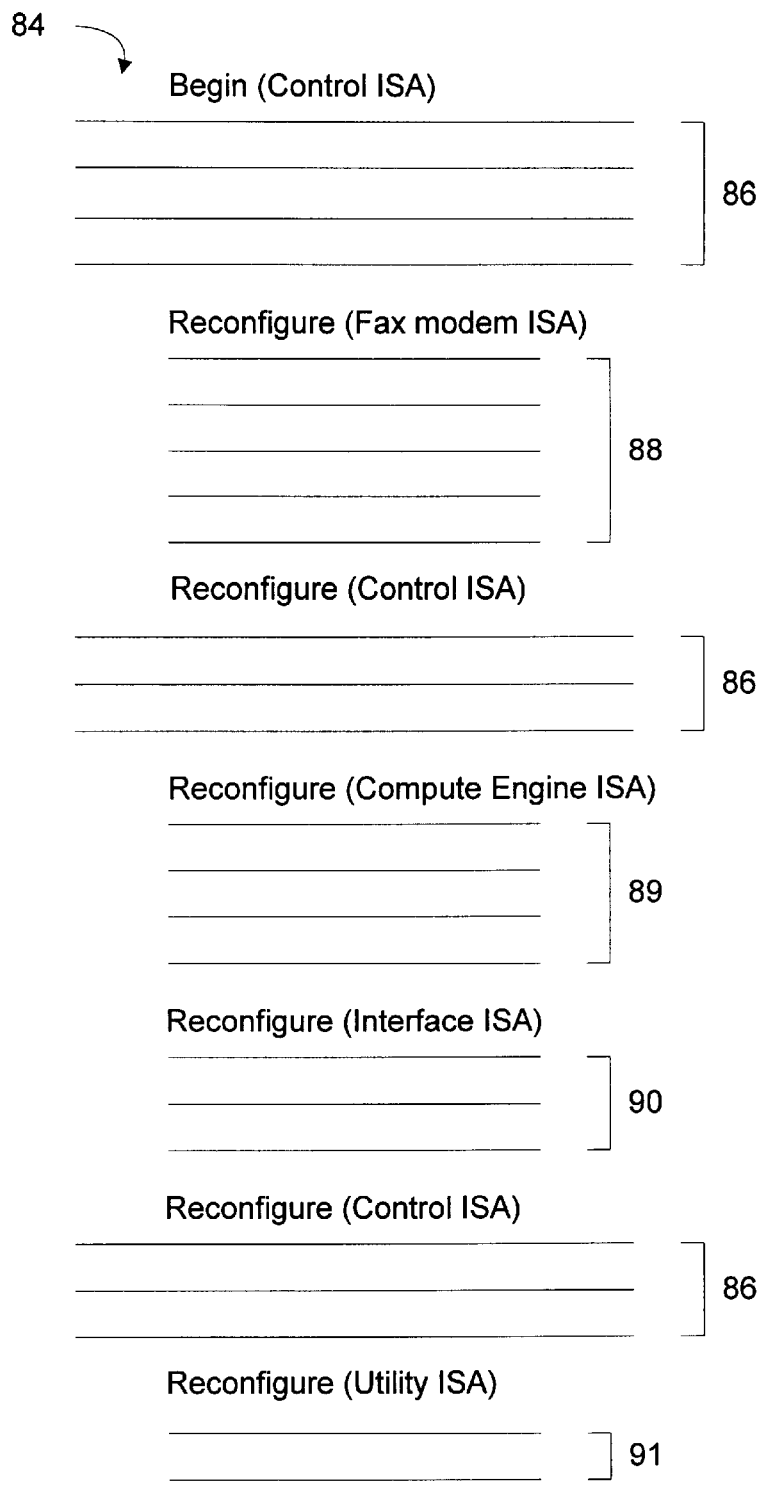
FIG. 4 is an exemplary program listing that includes reconfiguration directives.

Referring now to FIG. 4, an exemplary program listing 84 including reconfiguration directives is shown. As shown in FIG. 4, the exemplary program listing 56 includes a set of outer-loop portions 86, and inner loop portions 88, 89, 90, and 91. The term "outer loop" refers to those portions of a program that are mainly responsible for performing general-purpose operations and/or transferring control from one inner-loop portion to another. The term "inner loop" refers to an iterative portion of a program that is responsible for performing a particular set of related operations. In a preferred embodiment, outer-loop portion 86 corresponds to the control ISA. The inner loop portions 88–91 correspond to the fax modem, compute engine, interface, and utility ISAs, respectively.

Figure 5:
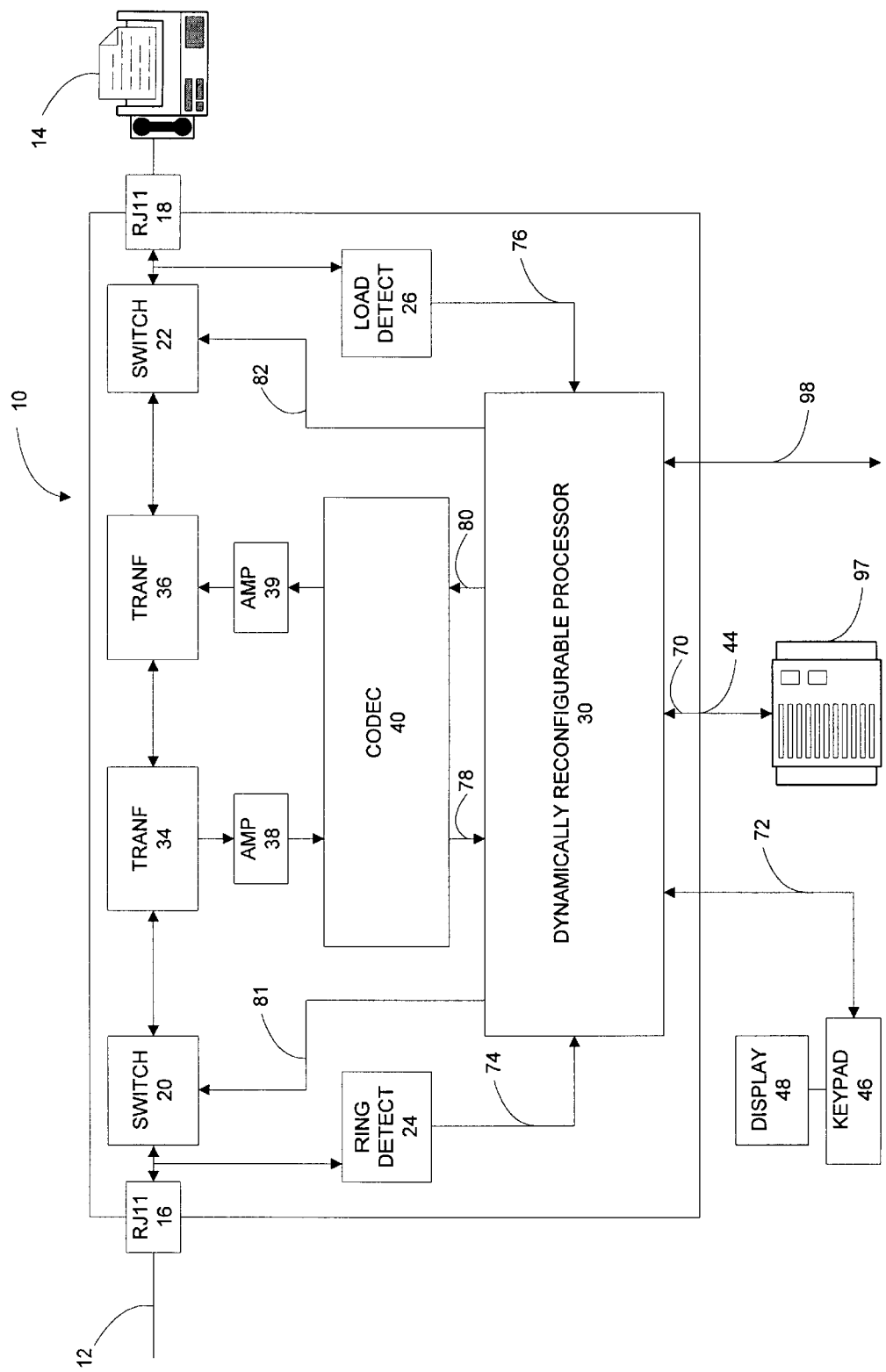
FIG. 5 is a block diagram of an alternative and second embodiment of an automatic capture device in accordance with the present invention.

Referring now to FIG. 5, there is shown an alternative embodiment of automatic capture device 10 in accordance with the present invention. For convenience and ease of understanding, like reference numerals are provided for like parts. This embodiment differs from the previous embodiment in that computer 42 is replaced with a disk array 97. Disk array 97 may be connected to automatic capture device 10 via the RS-232 interface and include control logic for automatically storing the raw fax data received via the serial connection. Alternatively, the interface ISA could be reconfigured to communicate with disk array 97 via standard hard drive protocols, such as programmed I/O ("PIO"), and control the disk array 97 directly.

FIG. 5 also illustrates an network connection coupled to line 98 for communicating with an attached network (not shown), such as an ethernet. Preferably, connection 98 is coupled to external peripheral circuitry such as a ethernet adapter (not shown), although the interface ISA could be reconfigured to implement the ethernet protocol directly. In a preferred embodiment, interface ISA would include optimized instructions for processing TCP/IP packets, allowing automatic capture device 10 to communicate with host computers on the Internet.

Figure 6:
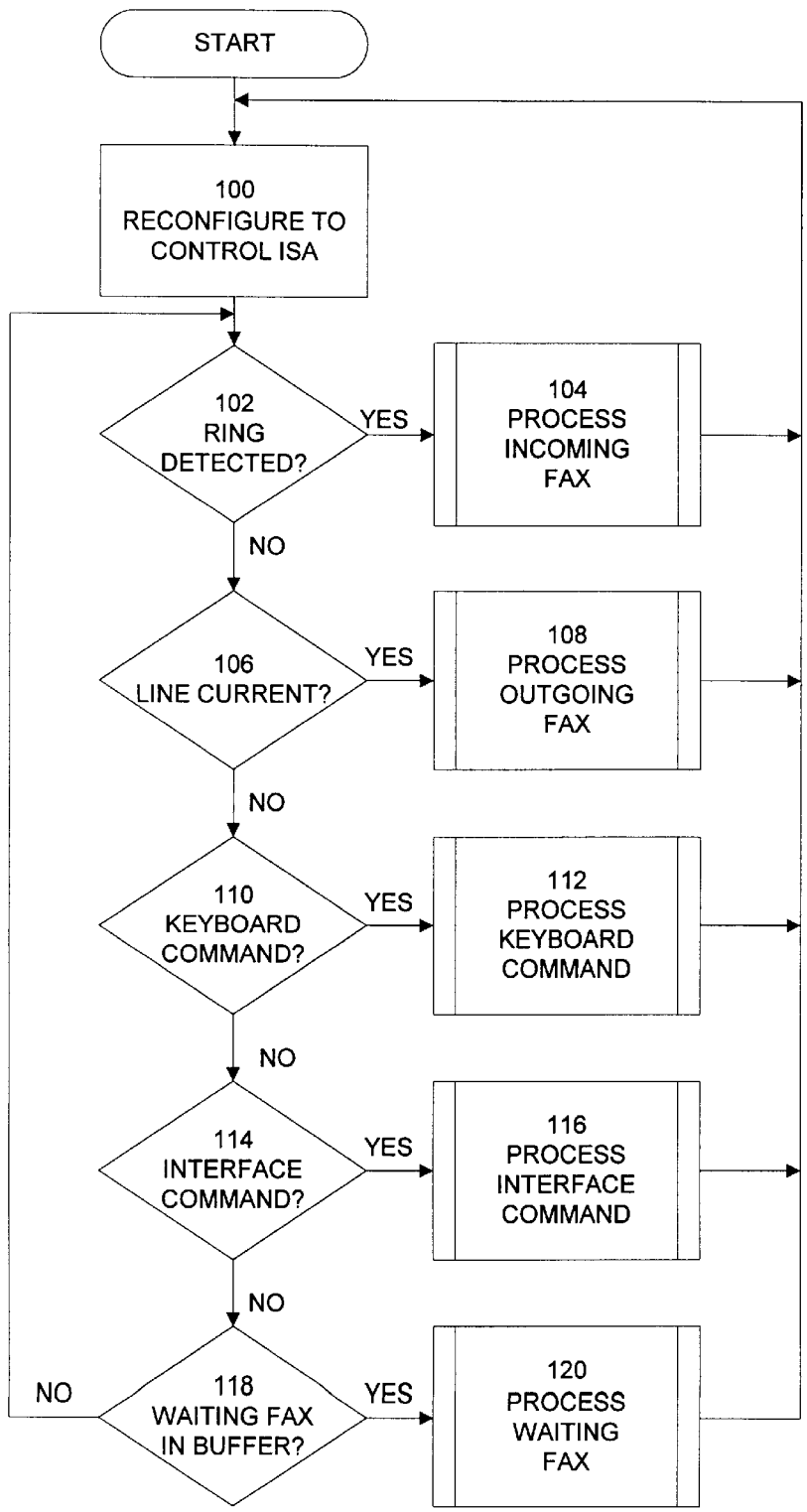
FIG. 6 is a flow diagram of a top-level control process of an automatic capture device in accordance with the present invention.

Referring now to FIG. 6, there is shown a flow diagram of a top-level control process for managing the operation of automatic capture device 10 in accordance with the present invention. Processing begins by reconfiguring 100 DRPU 50 to the control ISA. The control ISA is an outer-loop ISA that is mainly responsible for performing general-purpose operations and transferring control from one inner-loop portion to another. As noted earlier, upon encountering the reconfiguration directive, DRPU 50 transfers the corresponding configuration data set from PROM 54 to the FPGA within DRPU 50, and initiates the FPGA reconfiguration sequence. DRPU 50 is then reconfigured to provide an optimized implementation of the control ISA.

A check 102 is made whether a ring signal is detected on telephone line 12. To accomplish this, dynamically reconfigurable computer 30 checks the status of control signal input 74 of DRPU 50, which is attached to ring detector 24. If a ring signal is detected, then the Process Incoming Fax routine 104 is executed as described in more detail below in FIG. 7, after which control returns to step 100; otherwise, processing resumes at step 106.

A check 106 is made whether there is current on the line connected to fax machine 14. To accomplish this, dynamically reconfigurable computer 30 checks input 76 of DRPU 50, which is attached to load detector 26. If a signal is present, then the Process Outgoing Fax routine 108 is executed as detailed below with reference to FIG. 14, after which control returns to step 100; otherwise, processing resumes at step 110.

A check 110 is made whether a keyboard command has been entered by the user on keypad 46. In a preferred embodiment, keypad 46 is buffered so that a user may input a command although automatic capture device 10 may be unable to immediately process it. Consequently, keypad 46 will assert a signal on bi-directional data port 72 of DRPU 50 to inform dynamically reconfigurable computer 30 that a command is pending. If it is determined that a keyboard command has been entered, then the Process Keyboard Command routine 112 is executed as detailed below with reference to FIG. 18, and the process returns to step 100; otherwise, processing continues to step 114.

A check 114 is made whether a command is pending on interface 44. In a preferred embodiment, when computer 42 issues a command to automatic capture device 10 over interface 44, a signal will be asserted on bi-directional data port 70 to inform dynamically reconfigurable computer 30 that an interface command is pending. If a command is pending, then the Process Interface Command routine 116 is executed as detailed below with reference to FIG. 19, and control returns to step 100; otherwise, processing resumes at step 118.

A check 118 is made whether a fax stored in page buffer 53 is waiting to be sent. As will be described in greater detail hereafter, this situation arises in two contexts: (1) in modify mode when automatic capture device 10 is unable to forward a fax because the destination machine is unavailable, e.g., it is out of paper, busy, or the like; and (2) when an original fax is placed in page buffer 53 by computer 42 responsive to a "generate new fax" command. If a fax is waiting to be sent, then the Process Waiting Fax routine 120 is executed as detailed below with reference to FIG. 20, and control returns to step 100; otherwise, control resumes at step 100.

Figure 7:
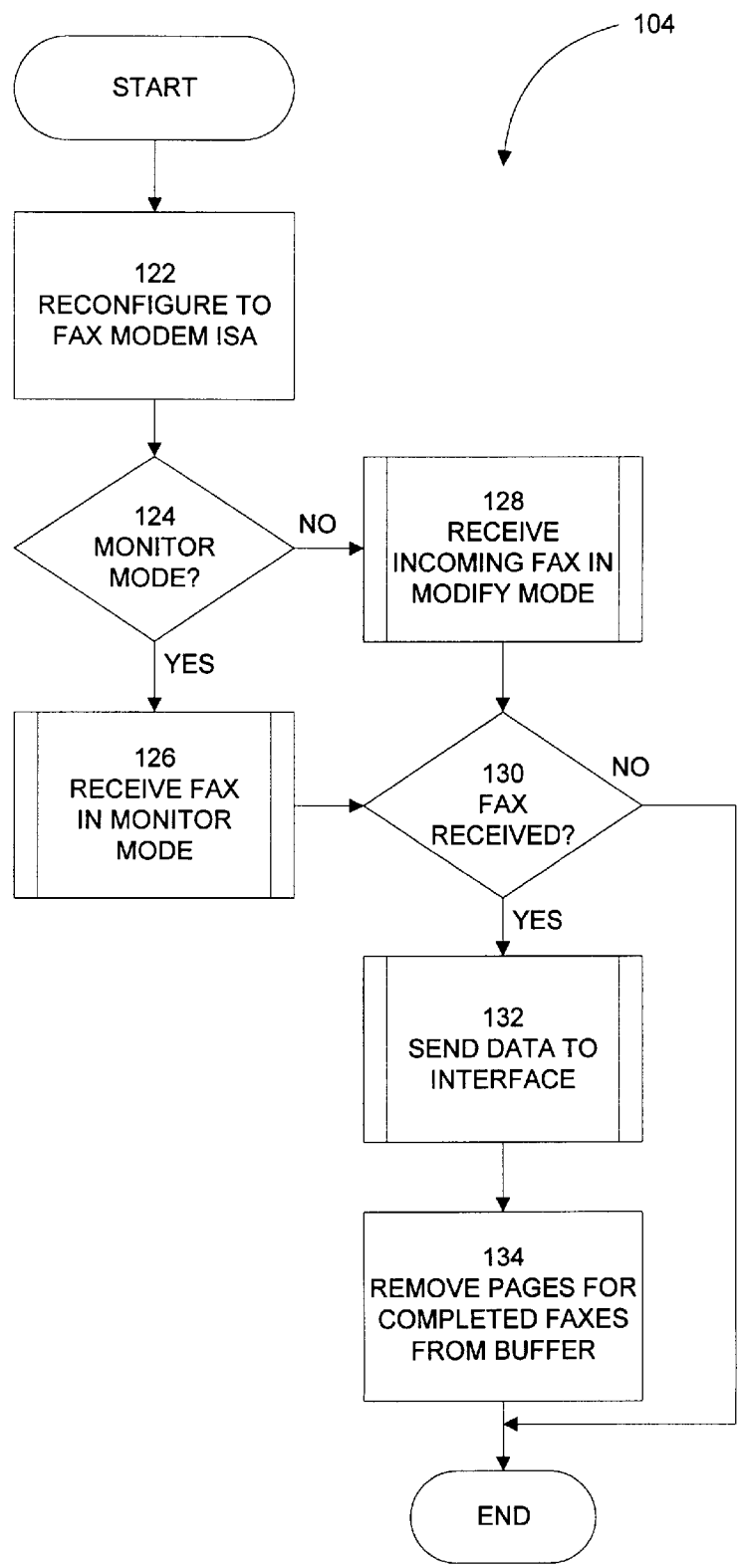
FIG. 7 is a flow diagram for a preferred method of processing incoming faxes in accordance with the present invention.

Referring now to FIG. 7, there is shown a flow diagram of a preferred method for processing 104 incoming faxes in accordance with the present invention. Processing begins by reconfiguring 122 DRPU 50 to the fax modem ISA. The fax modem ISA is an inner-loop ISA that is responsible for performing a class of operations, namely, monitoring, sending, and receiving facsimile transmissions.

A check 124 is made whether automatic capture device 10 is operating in monitor mode. As explained above, in monitor mode, automatic capture device 10 passively monitors incoming and outgoing fax messages from a local fax machine, without interfering with the transmissions. The operational modes of automatic capture device 10 are preferably stored in RAM 52. Thus, the operational mode of automatic capture device 10 is determined by checking a memory location in RAM 52. If device 10 is operating in monitor mode, then the Receive Fax in Monitor Mode routine 126 is executed as detailed below with reference to FIG. 8; otherwise, the Receive Incoming Fax in Modify Mode routine 128 is executed as detailed below with reference to FIG. 11.

Processing continues after step 128 or step 126 by determining 130 whether the fax was received. This is accomplished by checking page buffer 53 to determine whether any new page data was stored during steps 126 or 128. In a preferred embodiment, automatic capture device 10 need not receive the entire fax transmission in order to process it. If no new data was received because, for example, of a transmission error, then the routine terminates. If the fax was received, the Send Data to Interface routine 132 is executed as detailed below with reference to FIG. 10. Thereafter, all pages corresponding to completed faxes are removed 134 from page buffer 53. In monitor mode, this would include all pages received in step 126, even if the transmission was terminated prematurely. In modify mode, however, only those faxes which were received and successfully forwarded to the local fax machine are removed from page buffer 53.

Figure 8:
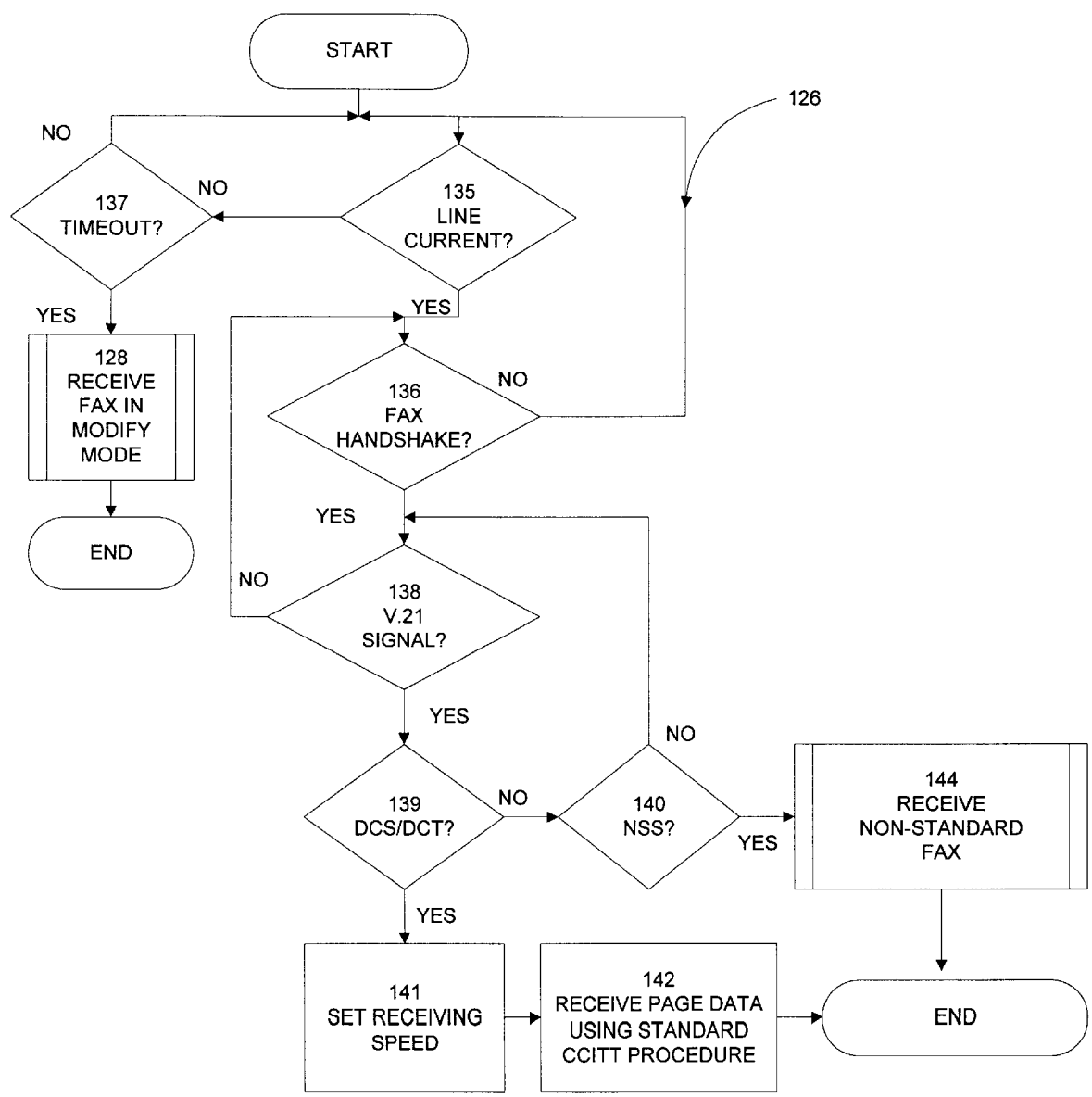
FIG. 8 is a flow diagram for a preferred method of receiving a fax in monitor mode in accordance with the present invention.

Referring now to FIG. 8, there is shown a flow diagram for a preferred method of receiving 126 a fax in monitor mode in accordance with the present invention. Processing begins by determining 135 whether fax machine 14 is generating a line current. To accomplish this, dynamically reconfigurable computer 30 checks control signal input 76 of DRPU 50, which is attached to load detector 26. If line current is detected, then the telephone call was answered by fax machine 14, and processing continues at step 136. If line current is not detected, a check 137 is made to determine whether the timeout period has expired for detecting line current. Preferably, the timeout period should be slightly longer than the time required for fax machine 14 to answer an incoming call. For example, if fax machine 14 answers a call after two rings, then the timeout period should be set to the length of three rings. One skilled in the art will realize that the timeout period is preferably stored in RAM 52, and may be changed by the user via keyboard 46. If the timeout period has not expired, then processing returns to step 135, and automatic capture device 10 continues to wait for fax machine 14 to answer. If the timeout period has expired, then fax machine 14 is unable to answer because, for example, it is out of paper. In that case, automatic capture device 10 may receive the fax and later forward it to fax machine 14 when the problem is resolved. This is accomplished by calling the Receive Fax in Modify Mode routine 128 as further detailed with reference to FIG. 11, after which the routine terminates.

Processing continues at step 136 by checking for a fax handshake signal, for example, a CCITT signal. If no signal is detected, then processing returns to step 135. If the handshake signal is detected, then a check 138 is made for the CCITT V.21 signal, which contains set-up information known as a training sequence. If the V.21 signal is not detected, then processing returns to step 136; otherwise, a check 139 is made whether a Digital Command Signal ("DCS") or Digital Transmit Command ("DTC") has been detected. These signals provide the receiving speed and allow codec 40 to properly demodulate and decode the signals according to standard CCITT procedures. If the DCS/DTC signal is not detected, then control passes to step 140; otherwise, the receiving speed is set 141 in accordance with the DCS/DTC and the fax page data is received 142 using standard CCITT procedures, after which the routine terminates.

If the DCS/DTC signal is not detected in step 139, processing continues by testing 140 for a Non-Standard Setup Command ("NSC") followed by Non-Standard Specifications ("NSS"). A non-standard format transmission is indicated by following the non-standard frame with non-standard set-up conditions, including various set-up options including page transmission speed and page encoding scheme. If the NSS is not detected, then processing returns to step 138; otherwise, the Receive Non-Standard Fax routine 144 is executed as detailed with reference to FIG. 9, and the routine terminates.

Figure 9:
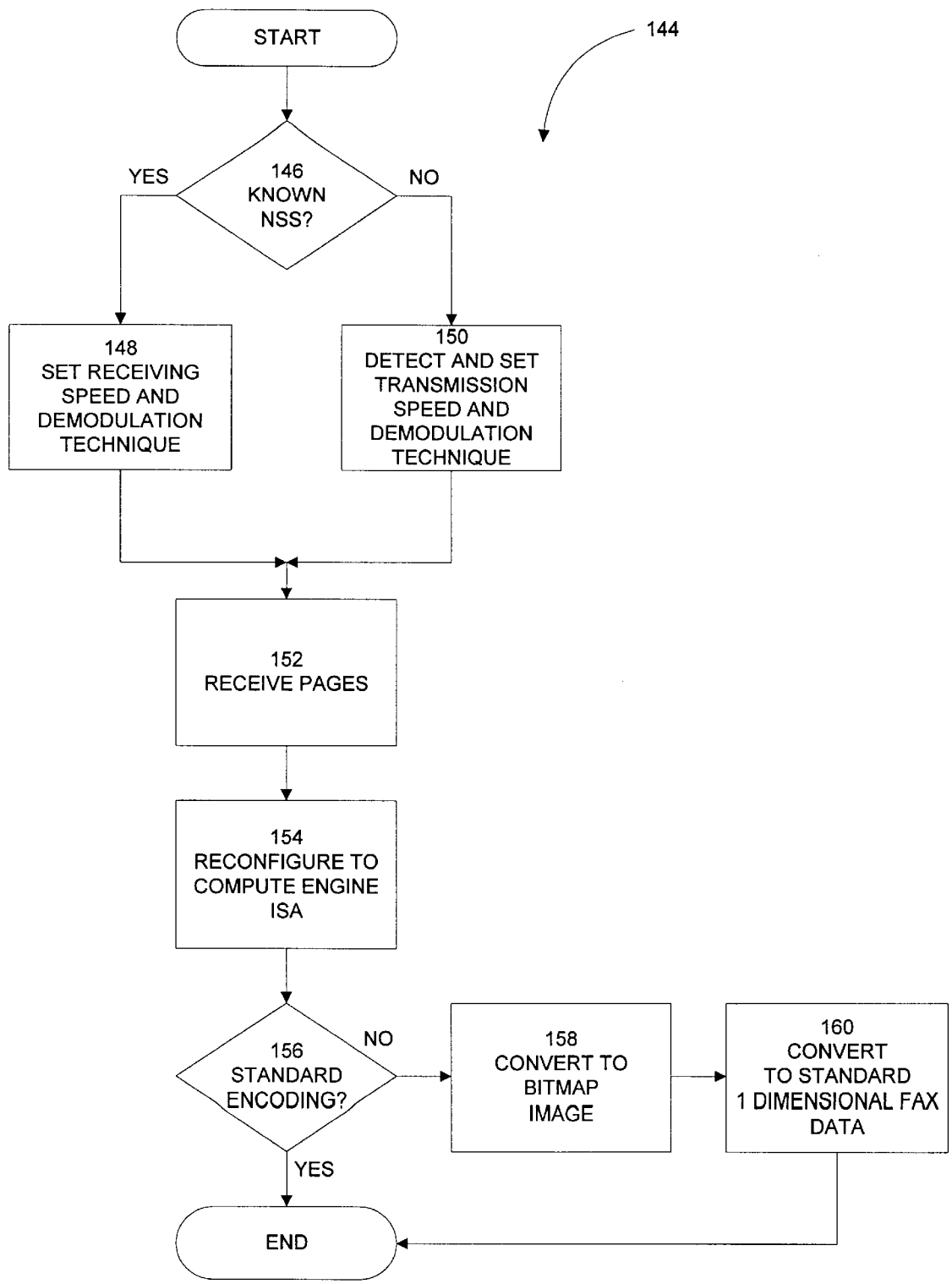
FIG. 9 is a flow diagram for a preferred method of receiving non-standard faxes in accordance with the present invention.

Referring now to FIG. 9, there is shown a flow diagram for a preferred method of receiving 144 non-standard faxes in accordance with the present invention. Processing begins comparing 146 the information in the non-standard frame with known non-standard format information compiled in the memory 52 of dynamically reconfigurable computer 30. Non-standard format information may be obtained from manufacturer specifications or compiled by monitoring the transmissions between faxes of the same manufacturer. If the information matches a known NSS, the proper demodulation technique and receiving speed is set 148. If the information does not match any of the stored information, dynamically reconfigurable computer 30 must detect 150 the transmission speed and modulation technique. A method for detecting the transmission speed and modulation technique of an NSS is disclosed in U.S. Pat. No. 5,617,221, entitled "Facsimile Modem for Passing Image Information to a Facsimile Machine and a Computer." The fax pages are then received 152 according to the parameters specified by the known or detected NSS.

Processing continues by reconfiguring 154 DRPU 50 to the compute engine ISA. The compute-engine ISA is an "inner loop" ISA that includes specialized instructions for processing fax data, including optimized instructions for image processing. A check 156 is made whether the fax data is encoded using the standard one- or two-dimensional encoding scheme. If the answer is "yes," then the fax information is decoded according to standard fax decoding procedures, and the routine terminates. If a non-standard encoding method is used, the page information is converted 158 into a bit map image, which is then encoded 160 into standard one-dimensional data, after which the routine terminates.

Figure 10:
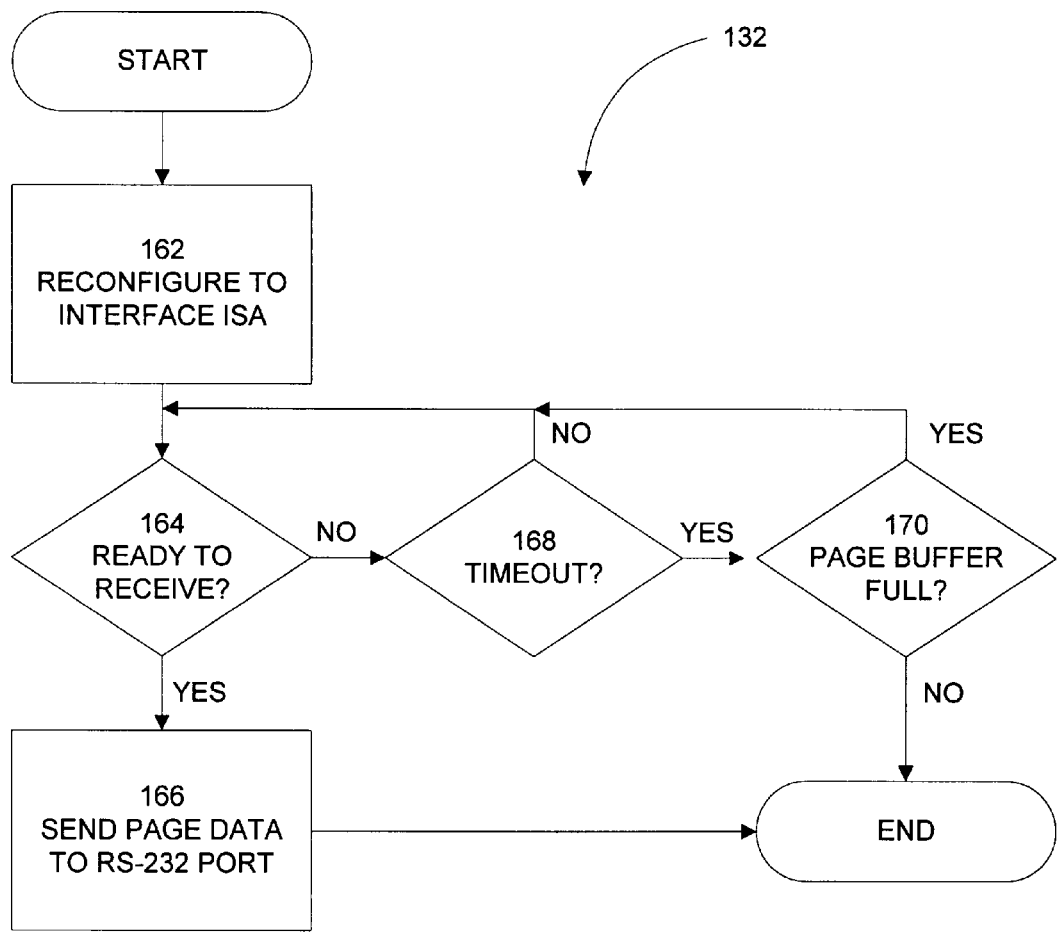
FIG. 10 is a flow diagram for a preferred method of sending page data to an RS-232 interface in accordance with the present invention.

Referring now to FIG. 10, there is shown a flow diagram for a preferred method of sending 132 page data from computer 30 to interface 144 in accordance with the present invention. Processing begins by reconfiguring 162 DRPU 50 to the interface ISA, which is an inner loop ISA including optimized instructions for transferring data. A check 164 is made whether computer 42 is ready to receive the data stored in page buffer 53. This is accomplished by checking the associated control signal on bi-directional data port 70. One skilled in the art will recognize that the data terminal ready ("DTR") signal could be used for this purpose. If computer 42 is ready to receive data, then the page data is sent 166 to the remote computer via the RS-232 port using a conventional RS-232 transmission protocol. If computer 42 is not ready, a check 168 is made whether the timeout period has expired for receiving the ready signal. If the answer is "no," then control returns to step 164; otherwise a check 170 is made whether page buffer 53 is full. If the buffer is full, control preferably returns to step 164, and automatic capture device 10 waits for computer 42 to become ready, since automatic capture device 10 will be unable to receive more faxes without losing the data already stored in buffer 53. If space remains in buffer 53, the routine terminates, and the page data is retained in the buffer until the Send Data to Interface routine 132 is executed again, at which time the retained data will be transmitted to computer 42.

Figure 11:
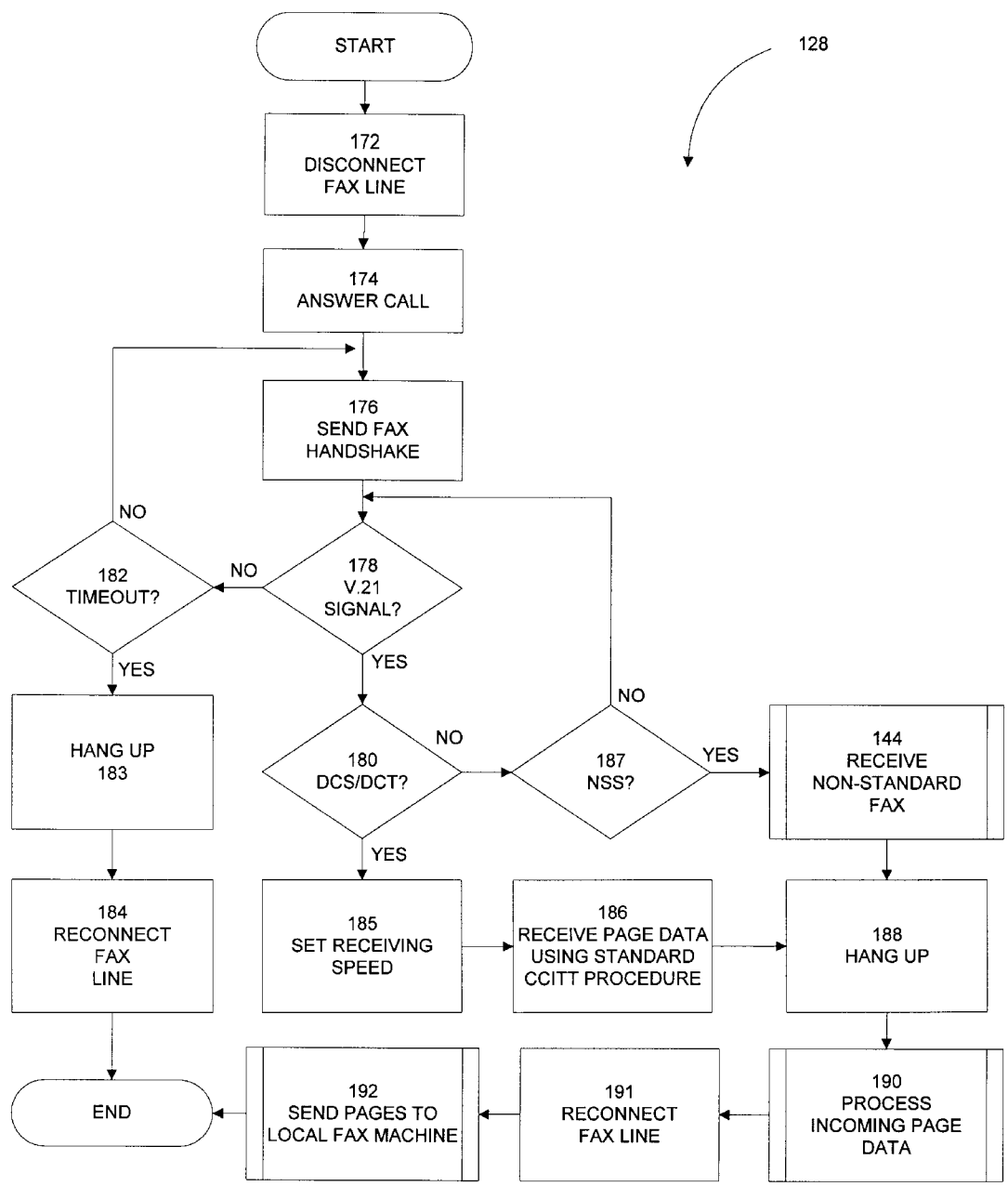
FIG. 11 is a flow diagram for a preferred method of receiving a fax in modify mode in accordance with the present invention.

Referring now to FIG. 11, there is shown a flow diagram for a preferred method of receiving 126 an incoming fax in modify mode in accordance with the present invention. Modify mode differs from monitor mode in that the fax data being transmitted is modified in some way from when the data is received at connector 16 and output at connector 18, or vice versa. In a preferred embodiment, automatic capture device 10 is capable of encrypting an outgoing fax message from fax machine 14, as well as decrypting an incoming fax message. For example, automatic capture device 10 intercepts the incoming call before fax machine 14 answers, receives and decrypts the page data, and forwards the processed data to fax machine 14.

Processing begins by disconnecting 172 the line to fax machine 14 in order to prevent fax machine 14 from answering the call. To do this, dynamically reconfigurable computer 30 uses control line 81 to open switch 22. If fax machine 14 later attempts to originate an outgoing fax while the present routine is running, it will encounter a "no dial tone" condition, which it will then handle according to standard operating procedures. Next, dynamically reconfigurable computer 30 answers 174 the call using codec 40 and the attached low impedance transformer 36. In like manner, dynamically reconfigurable computer 30 sends 176 the CCITT fax handshake signal to the remote fax machine (not shown) via telephone line 12.

A check 178 is then made for the CCITT V.21 signal. If the signal is detected, then processing continues at step 180; otherwise, a check 182 is made whether the timeout period for the V.21 training sequence has expired. If the period has expired, then control returns to step 176; otherwise, automatic capture device 10 "hangs up" 183 by dropping carrier, and reconnecting 184 fax machine 14 by closing switch 22, after which the routine terminates.

If the V.21 training sequence is detected in step 178, processing continues by determining 180 whether the DCS/DTC signal has been detected. If the answer is "yes," the receiving speed is set 185 in accordance with the DCS/DTC, the page data is received 186 using standard CCITT procedures, and the process continues at step 188. If the training sequence is not received, a check 187 is made for the NSS signal. If the NSS is not detected, then processing returns to step 178; otherwise, the Receive Non-Standard Fax routine 144 is executed as detailed with reference to FIG. 9.

Processing continues after either step 144 or step 186 by "hanging up" 188 the outgoing line. Next, the Process Incoming Page Data routine 190 is executed as detailed with reference to FIG. 12. During this step, dynamically reconfigurable computer 30 uses the compute engine ISA to perform manipulations on the received data, such as decryption or decompression. Thereafter, the line to fax machine 14 is reconnected 191, the Send Pages to Local Fax Machine routine 192 is executed as detailed with reference to FIG. 13, and the process is complete.

Figure 12:
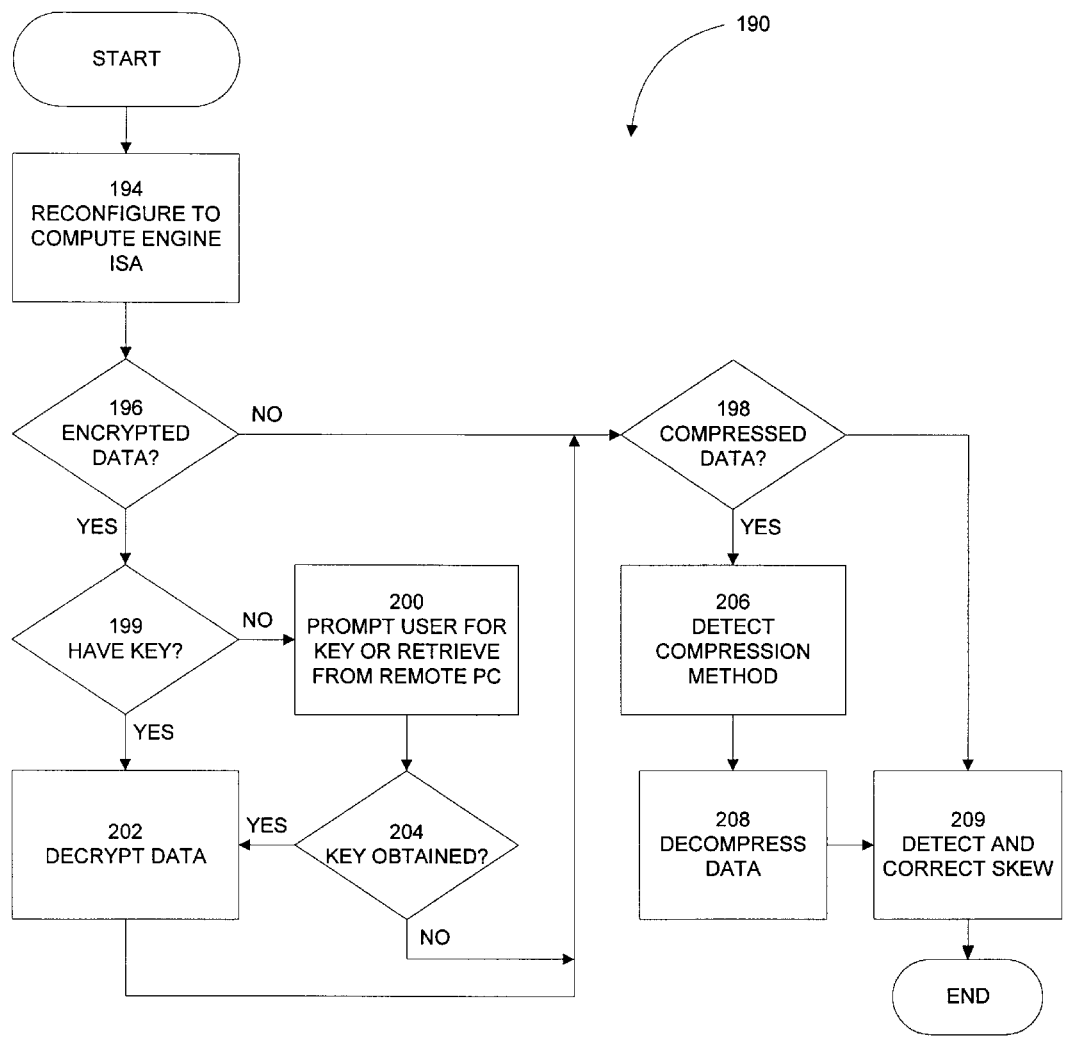
FIG. 12 is a flow diagram for a preferred method of processing incoming page data in accordance with the present invention.

Referring now to FIG. 12, there is shown a flow diagram for a preferred method of processing 190 the incoming page data in accordance with the present invention. Processing begins by reconfiguring 194 DRPU 50 to the compute engine ISA, which is an inner loop ISA comprising optimized instructions for manipulating fax data. A check 196 is made whether the data is encrypted. One skilled in the art will recognize that a descriptor or tag is sent along with the fax transmission in order to tell automatic capture device 10 that the transmission is encrypted. Thus, in a preferred embodiment, dynamically reconfigurable computer 30 scans the fax data for such a descriptor or tag. In an alternative embodiment, dynamically reconfigurable computer 30 could be selectively configured to decrypt all incoming transmissions, regardless of whether a descriptor was present.

If no descriptor is found, processing continues with step 198; otherwise, a check 199 is made to determine whether dynamically reconfigurable computer 30 has the key for the given encryption method. If the answer is "yes," then dynamically reconfigurable computer 30 decrypts 202 the data using the corresponding decryption algorithm and key, and control passes to step 198. For example, the page data may be encrypted using the Data Encryption Standard ("DES") algorithm. Using methods well known to those of skill in the art, dynamically reconfigurable computer 30 decrypts the page data using RAM 52 as a buffer to store the decrypted data. When the processing is complete, computer 30 selectively deletes the encrypted data from RAM 52.

If computer 30 does not have the key, automatic capture device 10 prompts the user for the key via keypad 46 and associated display 48. Alternatively, automatic capture device 10 could retrieve the key from a database within computer 42 via interface 44. A check 204 is made as to whether the key was obtained. If the answer is "yes," control passes to step 202; otherwise, processing continues at step 198.

Processing continues by determining 198 whether the data is compressed. As with the encrypted data, a descriptor in the form of a header preferably indicates whether the fax data is compressed and what compression method is used. Alternatively, automatic capture device 10 could be selectively configured to decompress all data received, regardless of whether a descriptive header is present. If the data is not compressed, then processing continues at step 209; otherwise, the compression method is detected 206 by processing the header, or, alternatively, by scanning the fax data for other indications of the compression method. Thereafter, the data is decompressed 208 using the detected compression method. For example, if the fax data were compressed using Joint Photographer's Expert Group ("JPEG") compression, dynamically reconfigurable computer 30 uses the standard JPEG process well known to those of skill in the art to decompress the page data using RAM 52 as a buffer to store the decompressed data. When the processing is complete, computer 30 selectively deletes the compressed data from RAM 52.

After either step 198 or 208, processing continues by performing skew detection and correction on the facsimile data. Skew commonly occurs when a document is fed into a fax machine at a slight angle. Thus, the image is misaligned because the paper is not orthogonal with the frame of the scan. Dynamically reconfigurable computer 30 detects and automatically compensates for this effect using procedures well known to those of skill in the art.

Figure 13:
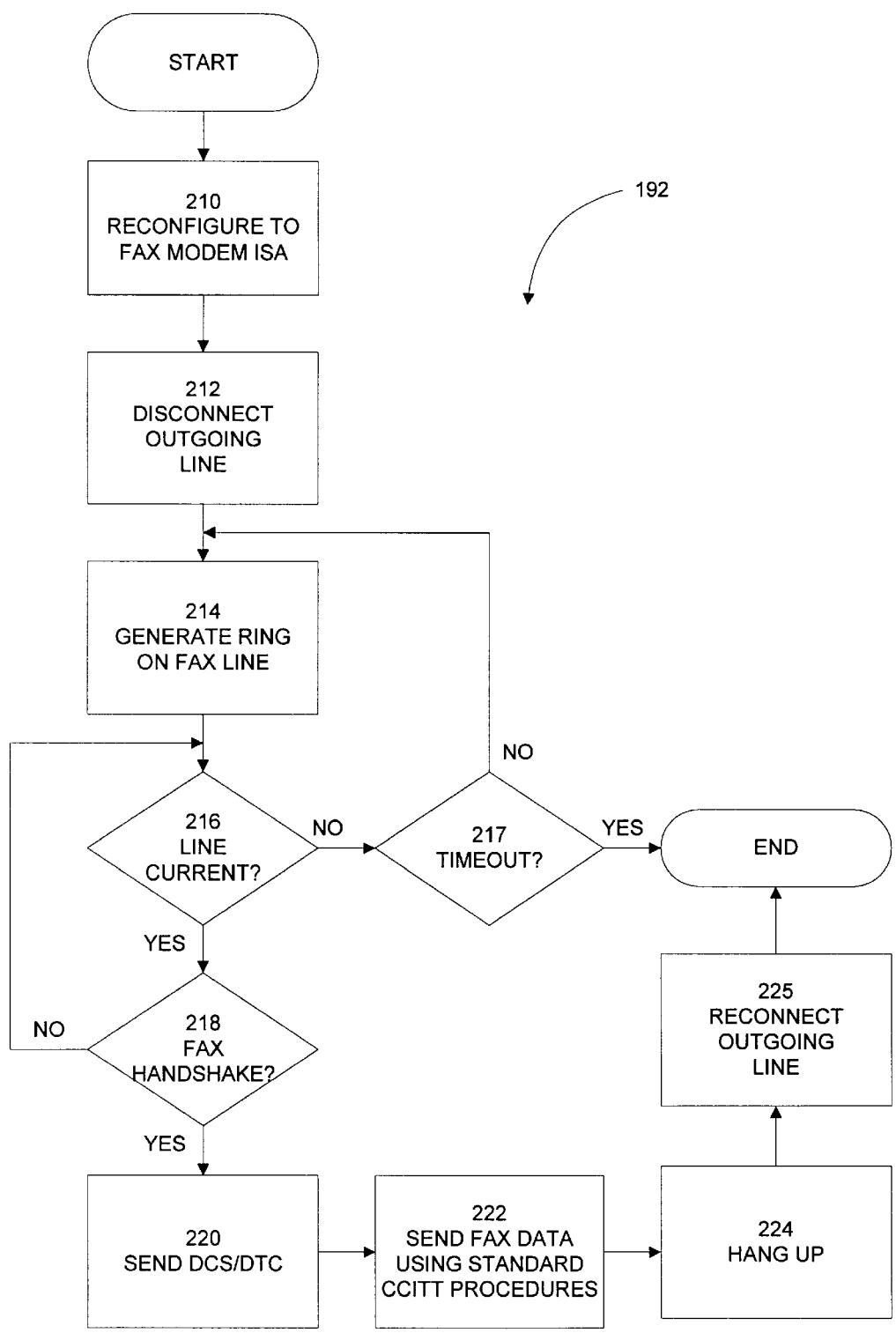
FIG. 13 is a flow diagram for a preferred method of sending pages to a local fax machine in accordance with the present invention.

Referring now to FIG. 13, there is shown a flow diagram for a preferred method of sending 192 pages to local fax machine 14 in accordance with the present invention. Processing begins by reconfiguring 210 DRPU 50 to the fax modem ISA. Dynamically reconfigurable computer 30 then disconnects 212 outgoing line 12 in order to prevent reception of incoming calls while automatic capture device 10 is sending data to fax machine 14. To do this, dynamically reconfigurable computer 30 uses control line 82 to open switch 20. If a remote fax machine attempts to contact local fax machine 14 while the present routine is running, it will encounter a standard "busy" signal generated by the telephone company, which the remote fax machine will handle according to standard operating procedures.

Next, a ring signal is sent to fax machine 14. One skilled in the art will realize how dynamically reconfigurable computer 30 may use codec 40 and low impedance transformer 36 to generate a standard ring signal. A check 216 is then made whether current is detected on the fax line, indicating that fax machine 14 has answered the call. If the answer is "yes," processing continues at step 218; otherwise, a check 217 is made whether the timeout period for fax machine 14 to answer has expired. If so, the routine terminates; otherwise, control returns to step 214.

If there is line current, processing continues from step 216 by determining whether the CCITT fax handshake signal has been received. If the answer is "no," then control returns to step 216; otherwise, a fax connection is established with fax machine 14 by sending 220 the DCS or DTC signal. Thereafter, the data stored in page buffer 53 is sent 222 to the local fax machine 14 using standard CCITT procedures. Finally, automatic capture device 10 "hangs up" 224 the fax line by dropping carrier, and reconnects 225 the outgoing line 12 to automatic capture device 10 by closing switch 20.

Figure 14:
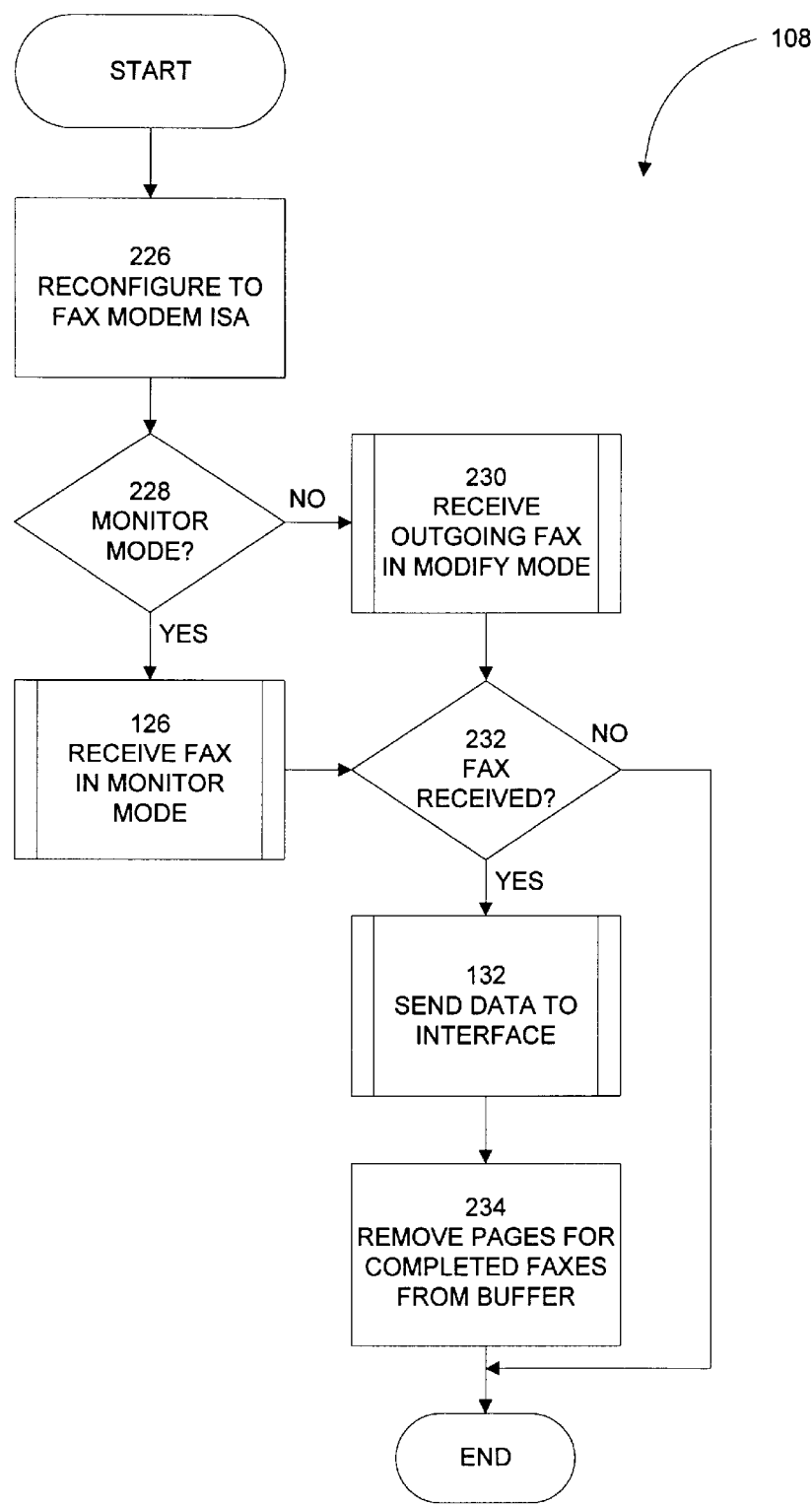
FIG. 14 is a flow diagram for a preferred method of processing outgoing fax data in accordance with the present invention.

Referring now to FIG. 14, there is shown a flow diagram for a preferred method of processing 108 outgoing fax data in accordance with the present invention. Processing begins by reconfiguring 226 DRPU 50 to the fax modem ISA. A check 228 is then made whether automatic capture device 10 is operating in monitor mode. If the answer is "yes," then the Receive Fax in Monitor Mode routine 126 is executed as detailed with reference to FIG. 8; otherwise, the Receive Outgoing Fax in Modify Mode routine 230 is executed as detailed with reference to FIG. 15.

After either step 230 or 126, processing continues by determining 232 whether the fax was received. This is accomplished by checking page buffer 53 to determine whether any new page data was stored during steps 126 or 230. In a preferred embodiment, automatic capture device 10 need not receive the entire fax transmission in order to process it. If no new page data has been received, then the routine terminates; otherwise, the Send Data to Interface routine 132 is executed as detailed with reference to FIG. 10. Thereafter, all pages corresponding to completed faxes are removed 234 from page buffer 53. In monitor mode, this would include all pages received in step 126, even if the transmission was terminated prematurely. In modify mode, however, only those faxes which were received and successfully forwarded to either the remote machine are removed from the page buffer.

Figure 15:
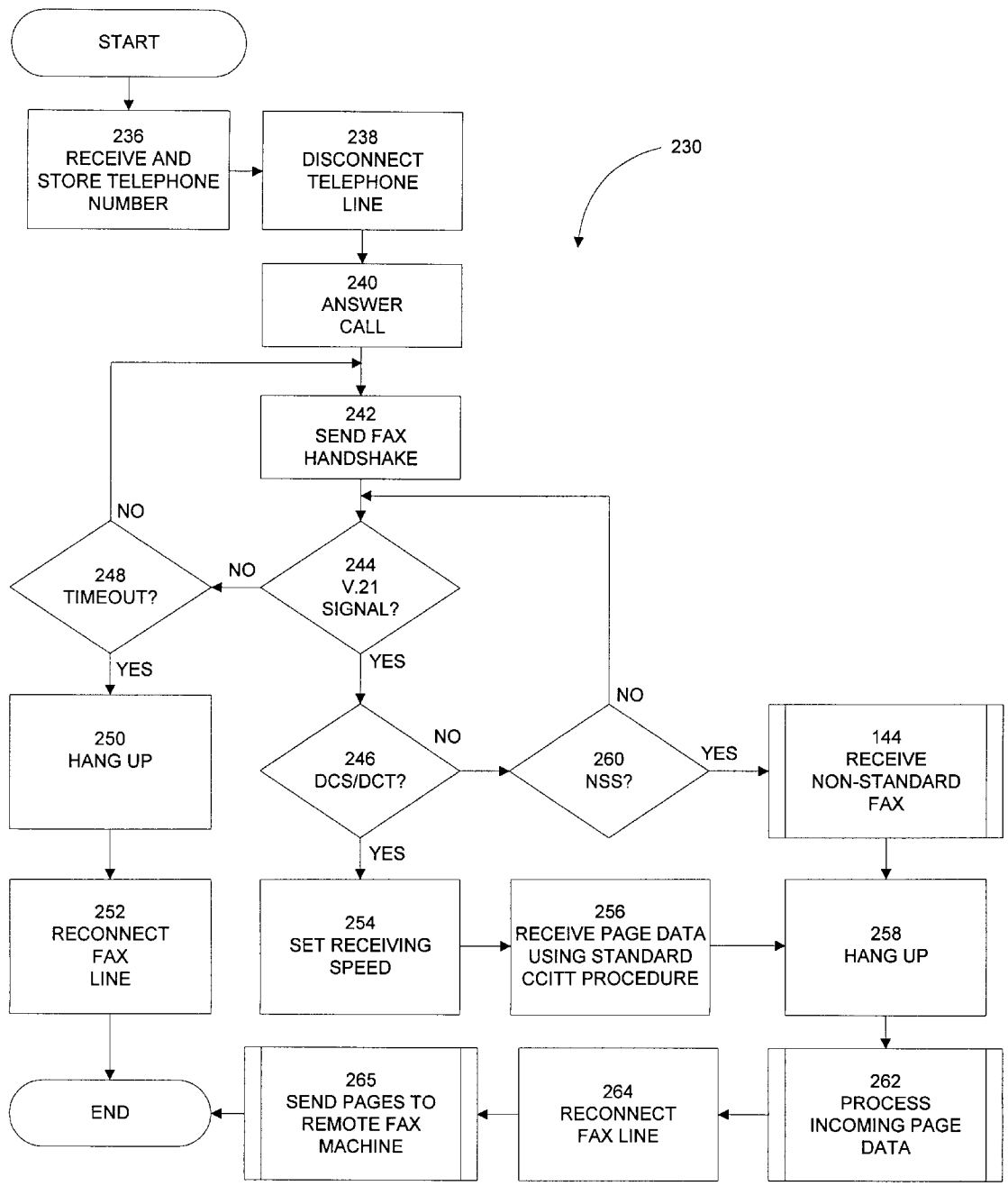
FIG. 15 is a flow diagram for a preferred method of receiving an outgoing fax in modify mode in accordance with the present invention.

Referring now to FIG. 15, there is shown a flow diagram for a preferred method of receiving 230 an outgoing fax in modify mode in accordance with the present invention. Processing begins by receiving and storing 236 the telephone number dialed by fax machine 14. One skilled in the art will recognize that dynamically reconfigurable computer 30 uses the high impedance transformer 34 and codec 40 to detect the tones generated by fax machine 14 and stores the telephone number in RAM 52. In addition, the telephone number is associated with the fax data that will be received.

Processing continues by disconnecting 238 outgoing line 12 in order to prevent reception of incoming calls while automatic capture device 10 is processing the outgoing fax message. To do this, dynamically reconfigurable computer 30 uses control line 82 to disconnect line 12 at switch 20. If a remote fax machine (not shown) attempts to contact local fax machine 14 while the present routine is running, it will encounter a standard "busy" signal generated by the telephone company, which it will handle according to standard operating procedures. Next, dynamically reconfigurable computer 30 answers 240 the call by using codec 40 and the attached low impedance transformer 36. In the same manner, dynamically reconfigurable computer 30 sends 242 the CCITT fax handshake signal to fax machine 14.

A check 244 is made for the CCITT V.21 signal. If the signal is detected, then processing continues at step 246; otherwise, a check 248 is made whether the timeout period for the V.21 training sequence has expired. If the timeout period has not expired, then control returns to step 242; otherwise, automatic capture device 10 "hangs up" 250 by dropping carrier, and reconnecting 252 outgoing line 12 by closing switch 20, after which the routine terminates.

If the V.21 training sequence is detected in step 244, processing continues by determining 246 whether the DCS/DTC signal has been detected. If the DCS/DTC signal is detected, then the receiving speed is set 254 in accordance with the DCS/DTC, the page data is received 256 using standard CCITT procedures, and control transfers to step 258. If the DCS/DTC is not detected, a check 260 is made for the NSS signal. If the NSS is not detected, then processing returns to step 244; otherwise, the Receive Non-Standard Fax routine 144 is executed as detailed with reference to FIG. 9, and automatic capture device 10 hangs up 258 the outgoing line 12.

Figure 16:
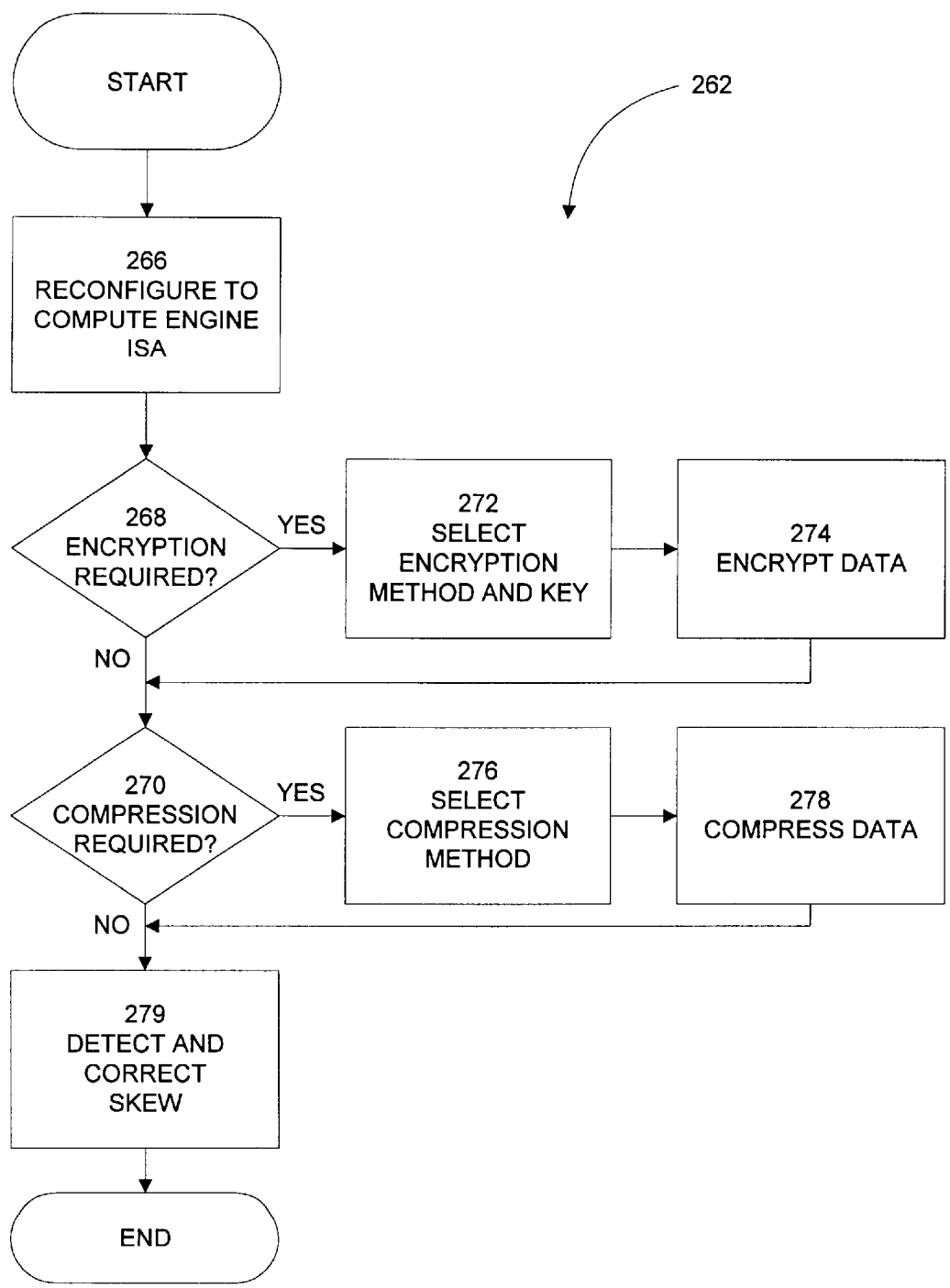
FIG. 16 is a flow diagram for a preferred method of processing outgoing page data in accordance with the present invention.

Processing continues by executing the Process Outgoing Page Data routine 262 as detailed in FIG. 16. During this step, dynamically reconfigurable computer 30 uses the compute engine ISA to perform manipulations on the received data, such as encryption or compression. Thereafter, telephone line 12 is reconnected 264 by closing switch 20, the Send Pages to Remote Fax Machine routine 265 is executed as detailed with reference to FIG. 17, and the routine ends.

Referring now to FIG. 16, there is shown a flow diagram for a preferred method of processing 262 outgoing page data in accordance with the present invention. Processing begins by reconfiguring 266 DRPU 50 to the compute engine ISA. Next, a check 268 is made whether encryption of the outgoing data is required. This is determined by checking an memory location of RAM 52 corresponding to the "encrypt outgoing faxes" mode of automatic capture device 10. One skilled in the art will recognize that operational modes of automatic capture device 10 may be selectively activated by means of keypad 46.

If encryption is not required, processing continues at step 270; otherwise, dynamically reconfigurable computer 30 selects 272 an encryption method and a key. Preferably, the encryption method and the particular key to be used were previously selected by the user by means of keypad 46; otherwise, a default encryption method and/or key could be used. Alternatively, automatic capture device 10 could obtain the encryption method and/or key from a remote computer 42 via interface 44, as necessary. In a preferred embodiment, the DES algorithm is used for encrypting fax messages. The DES algorithm is a strong, single-key encryption algorithm and is well known to those of skill in the art. However, many different encryption methods, such as public-key encryption, could be used without departing from the spirit of the invention. After selecting the method and key, dynamically reconfigurable computer 30 encrypts 274 the fax data using RAM 52 as a buffer to store the encrypted data.

Processing continues with determining 270 whether compression is required. As above, this is done by checking a memory location in RAM 52 corresponding to the "compress outgoing faxes" mode of automatic capture device 10. If compression is not required, the control passes to step 279; otherwise, dynamically reconfigurable computer 30 selects 278 the compression method. Preferably, the compression method to be used was previously selected by the user by means of keypad 46; otherwise, a default compression method could be used. Alternatively, automatic capture device 10 could obtain the compression method from remote computer 42 via interface 44, as necessary. In a preferred embodiment, a compression method such as JPEG is used because of its high compression ratio. JPEG compression is well known to those skilled in the art. After selecting the compression method, dynamically reconfigurable computer compresses 278 the fax data using RAM 52 as a buffer to store the compressed data.

After either step 270 or 207, processing continues by performing skew detection and correction on the facsimile data. Skew commonly occurs when a document is fed into a fax machine at a slight angle. Thus, the image is misaligned because the paper is not orthogonal with the frame of the scan. Dynamically reconfigurable computer 30 detects and automatically compensates for this effect using procedures well known to those of skill in the art.

Figure 17:
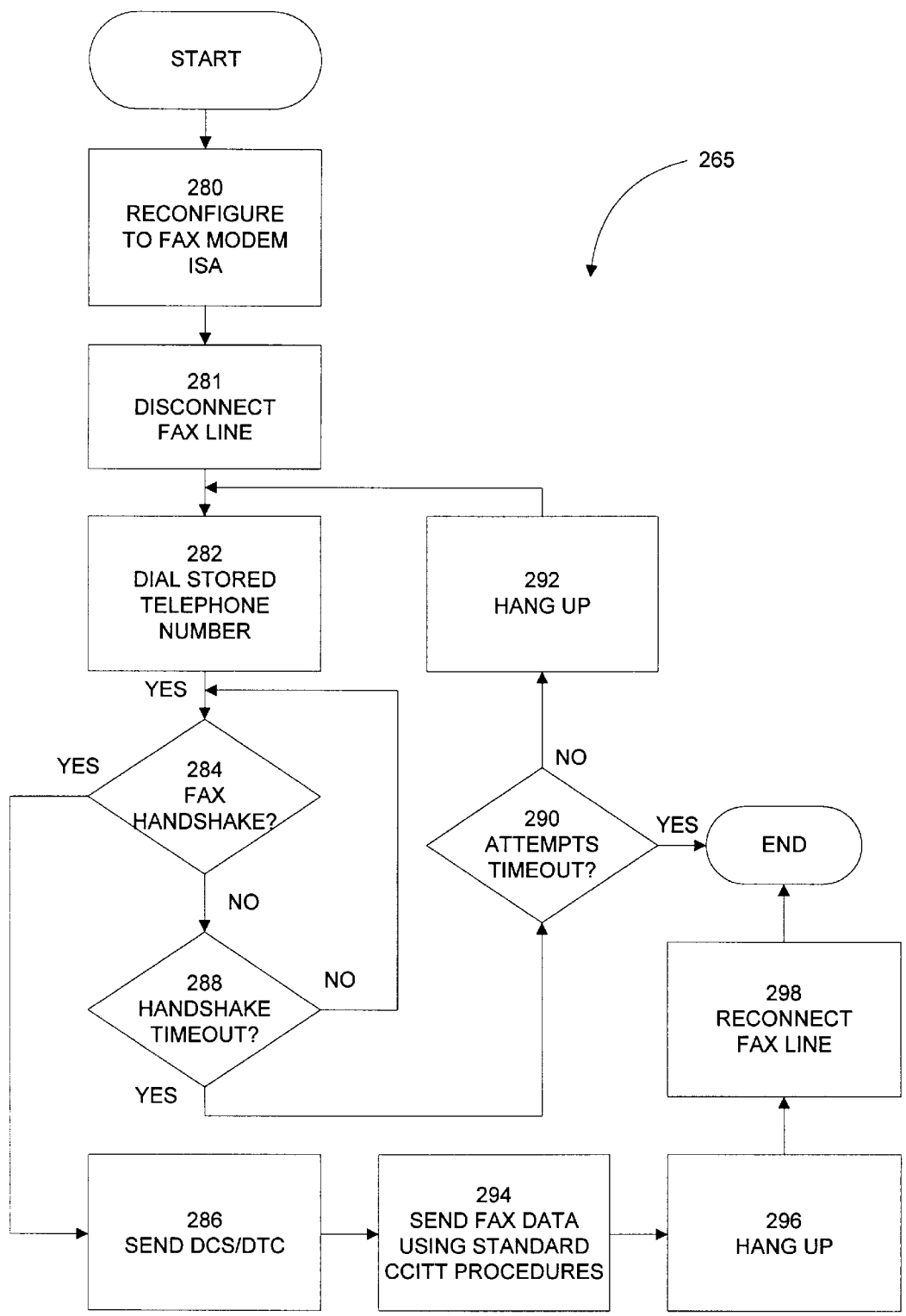
FIG. 17 is a flow diagram for a preferred method of sending pages to a remote fax machine in accordance with the present invention.

Referring now to FIG. 17, there is shown is a flow diagram for a preferred method of sending 265 pages to a remote fax machine in accordance with the present invention. Processing begins by reconfiguring 280 DRPU 50 to the fax modem ISA. Dynamically reconfigurable computer 30 then disconnects 281 fax machine 14 from automatic capture device 10 in order to prevent reception of outgoing calls while automatic capture device 10 is sending data to a remote fax machine. To do this, dynamically reconfigurable computer 30 uses control line 81 to open switch 22. If fax machine 14 later attempts to originate an outgoing fax while the present routine is running, it will encounter a "no dial tone" condition, which it will then handle according to standard operating procedures.

Next, automatic capture device 10 dials 282 the telephone number stored during step 236. One skilled in the art will realize how dynamically reconfigurable computer 30 may use codec 40 and low impedance transformer 36 to generate standard tones or pulses necessary to establish a telephone connection. A check 284 is then made whether a CCITT fax handshake signal is detected on line 12, indicating that the remote fax machine has answered the call. If the signal is detected, processing continues at step 286; otherwise, a check 288 is made whether the timeout period has been exceed for the remote fax machine to answer. If timeout period has not expired, then control returns to step 284; otherwise, a check 290 is made whether the maximum number of attempts has been reached. The remote fax machine may not respond for a variety of reasons. For example, it might be answering another call, out of paper, or in an error condition. Thus, automatic capture device 10 keeps track of the number of attempts for sending the current fax, preferably in an internal register of DRPU 50. The maximum number of attempts is preferably pre-selected by the user via keypad 46. If the maximum number of attempts has been reached, the routine ends; otherwise, automatic capture device 10 "hangs up" 292, and control returns to step 282.

If the handshake signal has been received, a fax connection is established with fax machine 14 by sending 286 the DCS or DTC signal to the remote fax machine. Thereafter, the data stored in page buffer 53 is sent 294 to the remote fax machine using standard CCITT procedures. Finally, automatic capture device 10 "hangs up" 296 the outgoing line by dropping carrier, and reconnects 298 fax machine 14 by closing switch 22.

Figure 18:
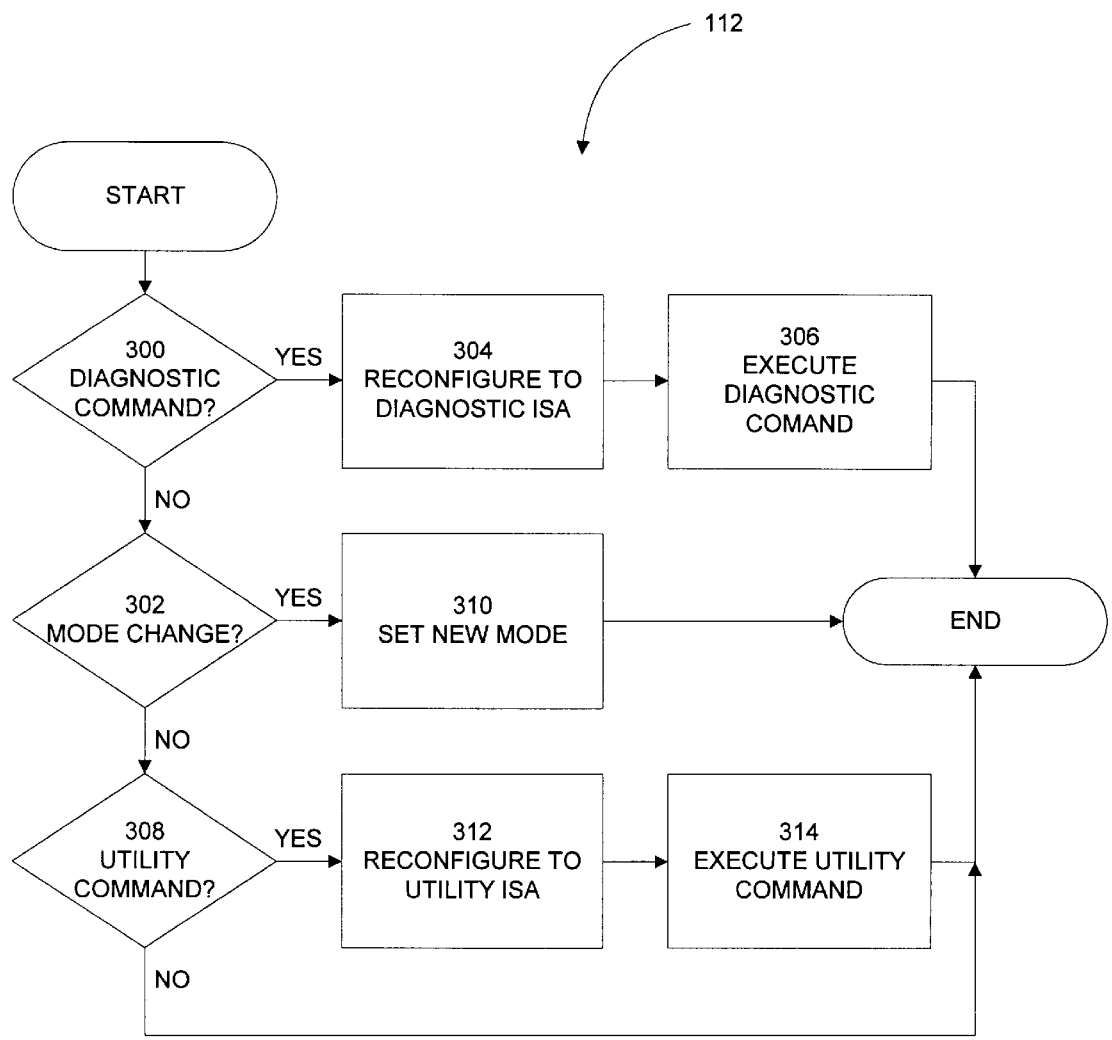
FIG. 18 is a flow diagram for a preferred method of processing a keyboard command in accordance with the present invention.

Referring now to FIG. 18, there is shown a flow diagram for a preferred method of processing 112 a keyboard command in accordance with the present invention. As noted above, keypad 46 may be used for a variety of purposes, such as selectively activating utility or diagnostic programs and selectively changing operational modes of automatic capture device 10. In a preferred embodiment, keypad 46 is buffered so that a user may input a command although automatic capture device 10 may be unable to immediately process it. For example, if automatic capture device 10 is receiving a fax transmission, then it is unable to immediately switch operational modes responsive to a keyboard command. In an alternative embodiment, however, automatic capture device 10 may comprise a plurality of DRPUs so that processing may be done in parallel. Thus, automatic capture device 10 could execute keyboard commands while performing other tasks. Preferably, keypad 46 will assert a signal on a data input port 72 of DRPU 50 to inform dynamically reconfigurable computer 30 that a keyboard command is pending.

Processing begins by determining 300 whether a diagnostic command has been entered. To accomplish this, dynamically reconfigurable computer 30 retrieves the buffered command string from keypad 46 via bi-directional data port 72 and compares the string against a list of diagnostic commands in memory 52. Examples of various diagnostic tests include: (1) verifying the integrity of RAM 52 and PROM 54; (2) loopback testing of codec 40 through the transformers 34, 36; (3) switch coupling testing; and (4) verifying whether the connectors 16, 18 are coupled. The foregoing tests are preferably part of a service package that uses dynamic reconfiguration for greatly augmented system testability. If the string does not match a diagnostic command, control transfers to step 302; otherwise, DRPU 50 is reconfigured 304 to the diagnostic ISA, the diagnostic command is executed 306, and the routine terminates.

Processing continues from step 300 by determining 302 whether a mode change command has been entered. To accomplish this, dynamically reconfigurable computer 30 retrieves the buffered command string from keypad 46 via bi-directional data port 72 and compares the string against a list of operational modes stored in memory. Automatic capture device 10 preferably has several operational modes, such as (1) monitor, (2) modify, (3) encrypt outgoing/incoming faxes, and (4) compress outgoing/incoming faxes. Similarly, operational variables such as timeout periods may also be set responsive to a keyboard command. If the command does not match a specified mode, control transfers to step 308; otherwise, the specified mode is set 310 by storing a value or setting a flag in a memory location of RAM 52, after which the routine terminates.

Processing continues from step 302 by determining 308 whether a utility command has been entered. To accomplish this, dynamically reconfigurable computer 30 retrieves the buffered command string from keypad 46 via bi-directional data port 72 and compares the string against a list of utility commands in memory. Examples of utility commands include security commands permitting ID code or password entry to secure operation of the automatic capture device 10 and network setup commands to establish network parameters. If the string does not match a utility command, the routine terminates; otherwise, DRPU 50 is reconfigured 312 to the utility ISA, the utility command is executed 314, and the routine terminates.

Figure 19:
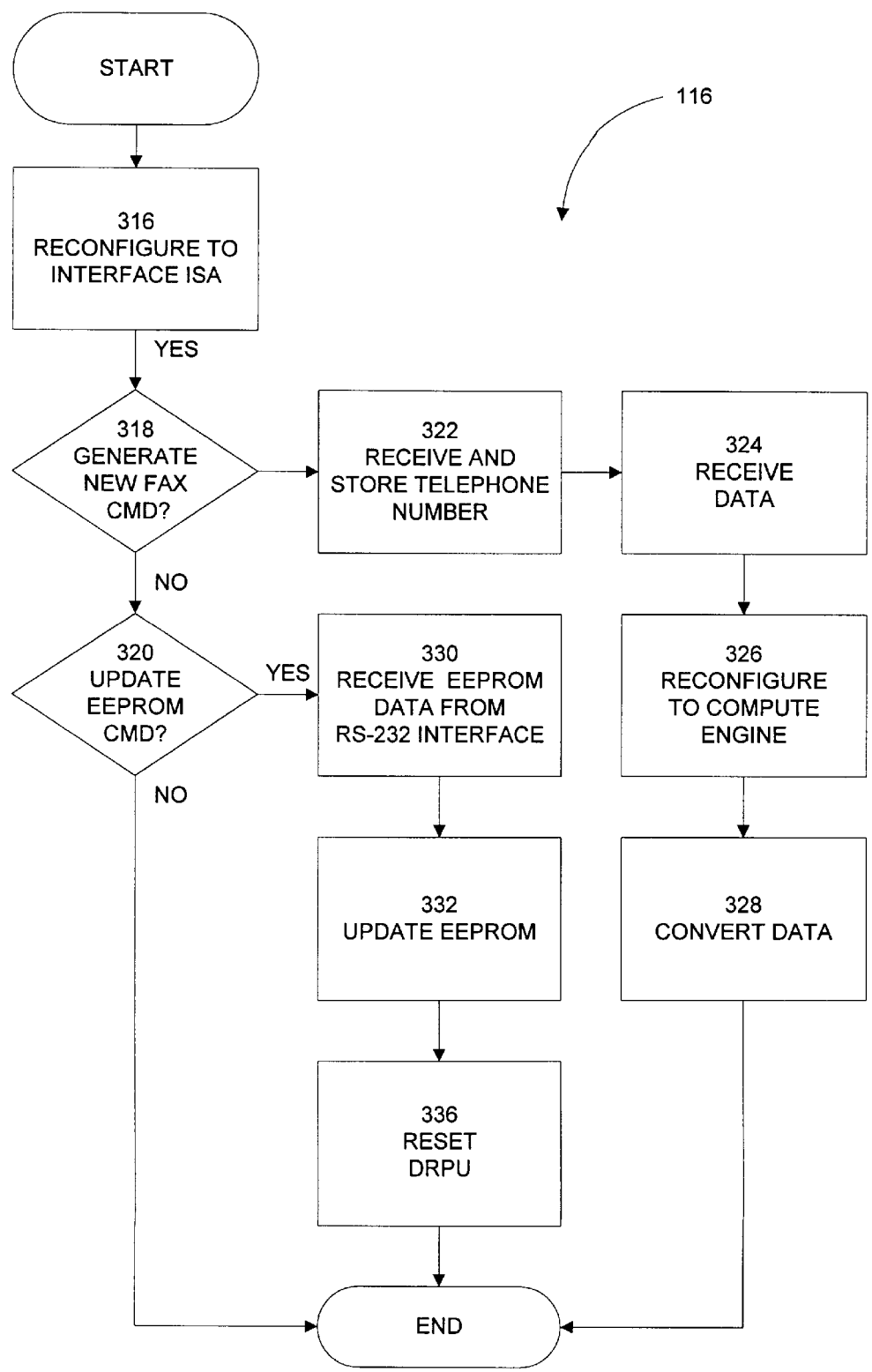
FIG. 19 is a flow diagram for a preferred method of processing an interface command in accordance with the present invention.

FIG. 19 is a flow diagram for a preferred method of processing 116 an interface command in accordance with the present invention. In a preferred embodiment, automatic capture device 10 is capable of receiving system commands from computer 42 via the RS-232 interface 44, including all of the keyboard commands set forth with reference to FIG. 18. For ease of illustration, only the new commands, not shown in FIG. 18, are described in FIG. 19, although one skilled in the art will recognize that the steps set forth in FIG. 18 should be added in a preferred embodiment. As noted above, when computer 42 issues a command to automatic capture device 10 over interface 44, a signal will be asserted on bi-directional data port 70 to inform dynamically reconfigurable computer 30 that an interface command is pending.

Processing begins by reconfiguring 316 DRPU 50 to the interface ISA. Thereafter, a check 318 is made whether the "generate new fax" command has been issued. To accomplish this, dynamically reconfigurable computer 30 retrieves the command string from interface 44 via bi-directional data port 70 and compares the string against a list of commands in memory 52. If the generate new fax command not detected, processing continues at step 320. This command allows automatic capture device 10 to send an original fax message based on data received from computer 42, not from another fax machine. Preferably, the fax was created on computer 42, or a computer attached to network 43, using standard fax creation software. In a preferred embodiment, the output image file produced by the fax creation software has a resolution of 200 dots per inch ("DPI"), and is stored in a standard image format such as Tagged Interchange File Format ("TIFF"). One skilled in the art, however, will recognize that many different formats are possible. However, the TIFF format is useful because it is the preferred output of many document scanning programs, and is well known to those skilled in the art.

If the generate new fax command is detected, processing continues by receiving 322 the telephone number of the outgoing fax. Preferably, the number is sent separately from the fax data. However, one skilled in the art will recognize that the telephone number could be incorporated into the fax data, possibly in a header, footer, or the like. The telephone number is then saved in a memory location of RAM 52, and is associated with the fax data to be received. Next, automatic capture device 10 receives 324 the fax data via the RS-232 interface. Processing continues by reconfiguring 326 DRPU 50 to the compute engine ISA. Dynamically reconfigurable computer 30 then converts 328 the received data into the required format for transmission to the remote fax machine, and the routine ends. This step may involve uncompressing the data or other similar transformations in order to convert it into a "raw" (unformatted) state, giving the data same format as data received and stored while operating in monitor mode.

A check 320 is made whether the "update PROM" command has been issued. To accomplish this, dynamically reconfigurable computer 30 retrieves the command string from interface 44 via bi-directional data port 70 and compares the string against a list of commands in memory. If the update PROM command not detected, the routine terminates. As noted above, PROM 54 is preferably flash upgradeable. Since PROM 54 stores the configuration data sets defining the DRPU hardware organization, automatic capture device 10 may be easily reconfigured to accommodate a wide variety of facsimile formats and computer interfaces by flash upgrading the PROM. Thus, automatic capture device 10 does not suffer from the deficiencies of the prior art brought about by static implementation logic.

If the update PROM command is detected, processing continues by receiving 330 into RAM 52 the updated PROM data via the RS-232 interface. Thereafter, dynamically reconfigurable computer 30 updates 332 PROM 54 with the new data. The process of updating a flash-upgradeable PROM with data stored in a RAM memory is well known in the art. After the PROM 54 is updated, DRPU 50 is reset 336 to its initial state, performs any "power-on" diagnostic and/or initialization functions, and begins processing instructions in the control ISA.

Figure 20:
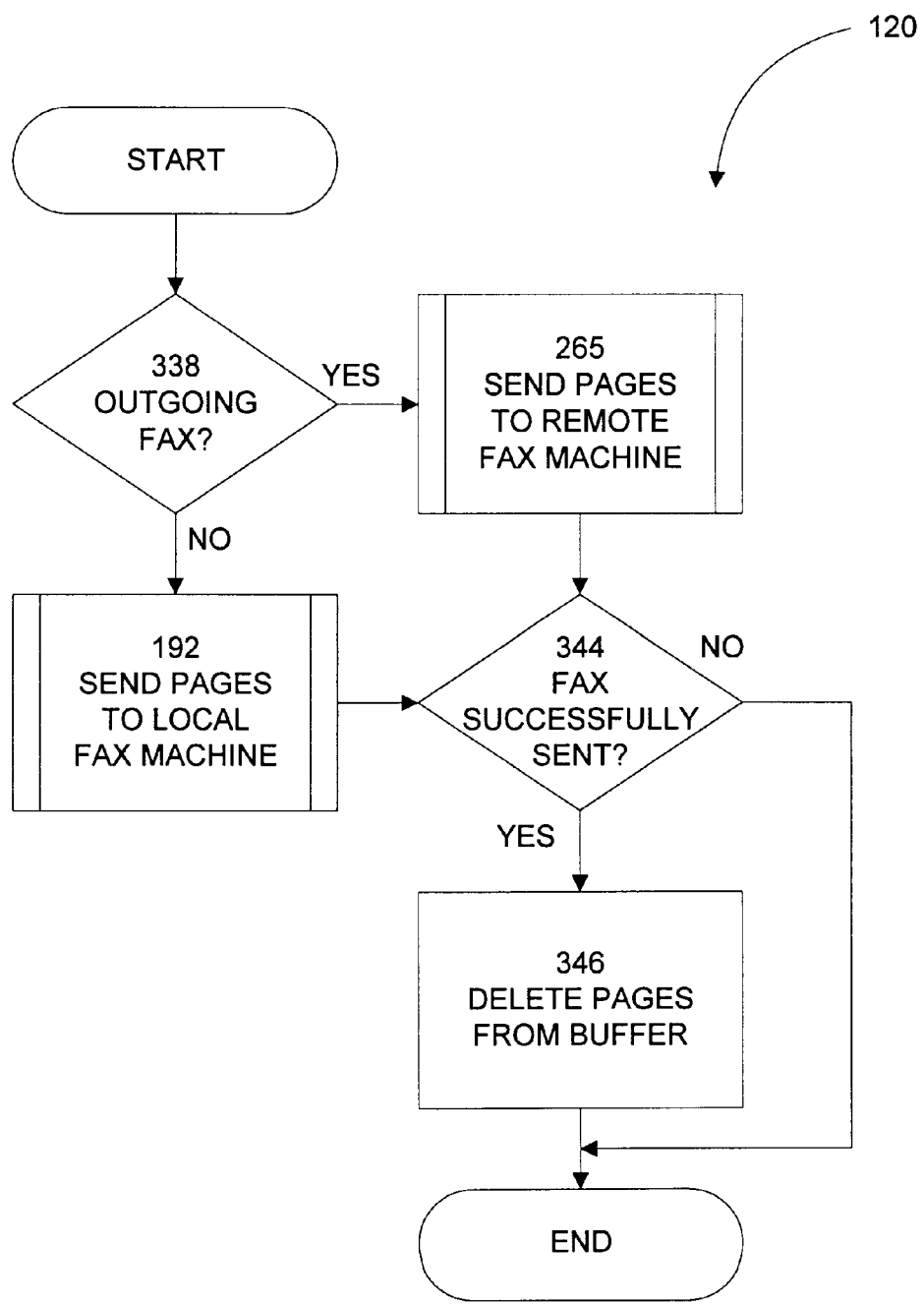
FIG. 20 is a flow diagram for a preferred method of processing a fax waiting in the page buffer in accordance with the present invention.

Referring now to FIG. 20, there is shown a flow diagram for a preferred method of processing 120 a fax waiting in page buffer 53 in accordance with the present invention. Processing begins by determining 338 whether the stored fax is "outgoing," e.g., directed to a remote fax machine. One skilled in the art will realize that this could be accomplished a number of ways, including determining whether the page data has an associated outgoing telephone number. Alternatively, dynamically reconfigurable computer 30 could check for an internal register or flag indicative of the incoming or outgoing status of the fax data.

If the fax is "outgoing," then the Send Pages to Remote Fax Machine routine 340 is executed as detailed with reference to FIG. 17; otherwise, the Send Pages to Local Fax Machine routine 342 is executed as detailed with reference to FIG. 13. Thereafter, a check 344 is made whether the fax was successfully sent. If the transmission was prematurely aborted due to line noise, for example, then the fax was not successfully sent, and automatic capture device 10 will attempt to send the fax at a later time. Thus, if the fax was not sent properly, the routine is terminated; otherwise, the associated pages in page buffer 53 are deleted 346, and the routine is terminated.

Figure 21:
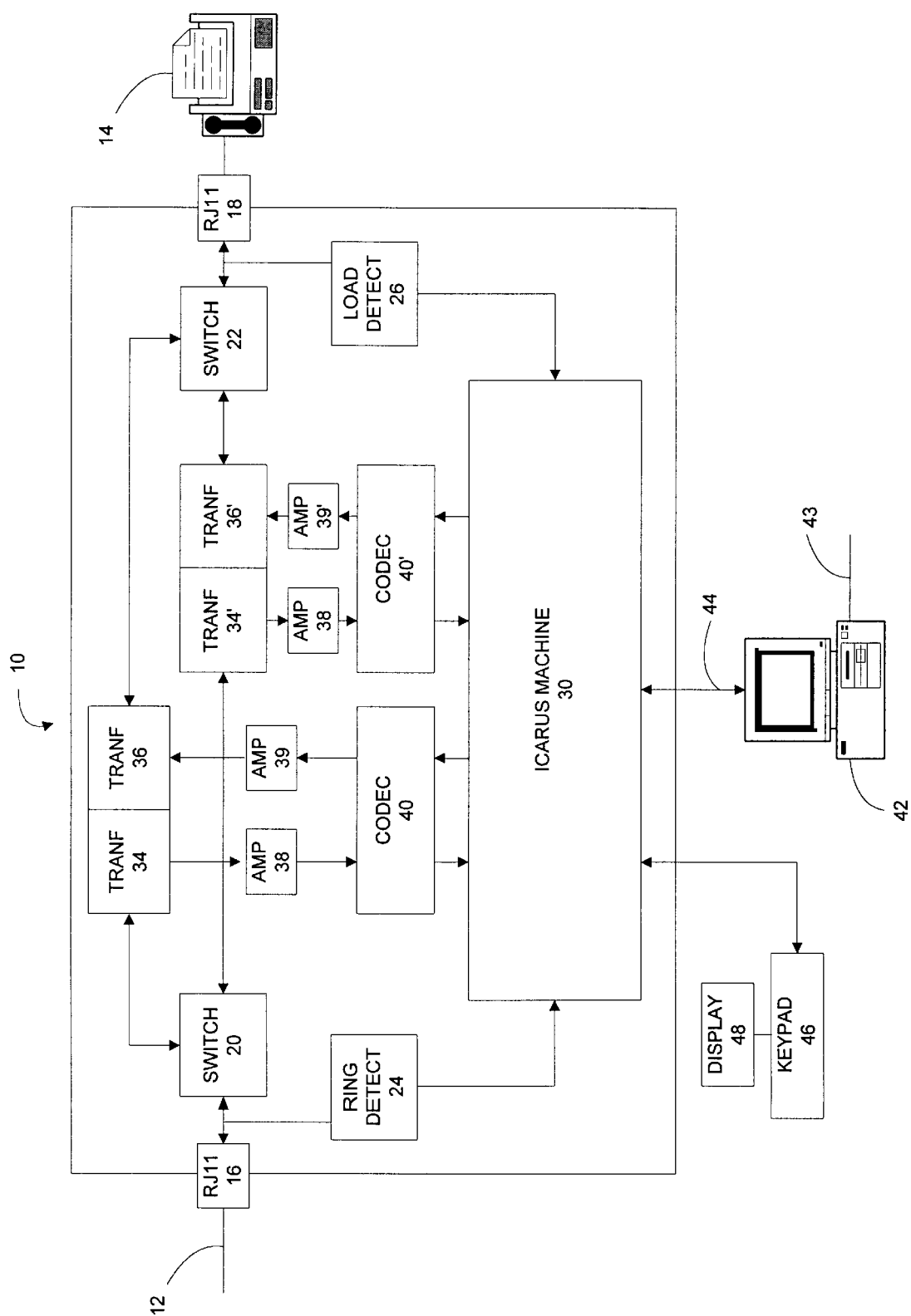
FIG. 21 is a block diagram of an alternative and third embodiment of an automatic capture device in accordance with the present invention.

Referring now to FIG. 21, there is shown an alternative and third embodiment of automatic capture device 10 in accordance with the present invention. This embodiment differs from the first preferred embodiment illustrated in FIG. 1 in that transformers 34, 36, amplifiers 38, 39, and codec 40 are duplicated by components 34', 36', 38', 39', 40', respectively, in order to permit simultaneous connections between automatic capture device 10 and both the local and remote fax machines. Additionally, switches 20, 22, are now preferably single-pole-double-throw ("SPDT") switches, allowing the telephone line and local fax machine to be selectively coupled to either set of transformers. One skilled in the art will recognize that dynamically reconfigurable computer 30 could also comprise two DRPUs, one processor controlling each half of automatic capture device 10. In that case, the dual DRPUs would share memory resources, and include interface circuitry for communicating with each other.

In monitor mode, this embodiment functions essentially like the first preferred embodiment. Switches 20, 22 are both set in the same position relative to one another in order to connect line 12 to fax machine 14 through one of the sets of transformers. Automatic capture device 10 then uses the connected high impedance transformer to redirect a small portion of the line current. The line current is then amplified, demodulated, decoded, and processed by dynamically reconfigurable computer 30.

The differences become apparent, however, when operating in modify mode, which, in the present embodiment, includes two sub-modes. In the "store and forward" sub-mode, automatic capture device 10 behaves substantially the same as it does in the first preferred embodiment. When receiving either an incoming or outgoing fax, automatic capture device 10 intercepts, receives, processes, and forwards the fax data to the destination fax machine using a single set of transformers and codecs. However, because of the duplicated hardware, automatic capture device 10 does not need to disconnect the unused line. For example, the step of disconnecting 172 the fax line in FIG. 11 is unnecessary, because automatic capture device 10 can use the duplicated hardware to receive an outgoing fax from fax machine 14 while receiving an incoming fax from a remote fax machine on telephone line 12. One skilled in the art will similarly recognize that the step of reconnecting 191 the fax line is unnecessary. The same is true for the "disconnecting" and "reconnecting" steps set forth in FIGS. 13, 15, and 17.

In the "simultaneous" sub-mode, however, automatic capture device 10 behaves quite differently than it does in the first preferred embodiment. Therein, automatic capture device 10 does not receive the entire transmission before forwarding it to its destination. Instead, automatic capture device 10 establishes, if possible, a connection with the destination fax machine and receives, processes, and forwards the fax data in real-time.

Figure 22:
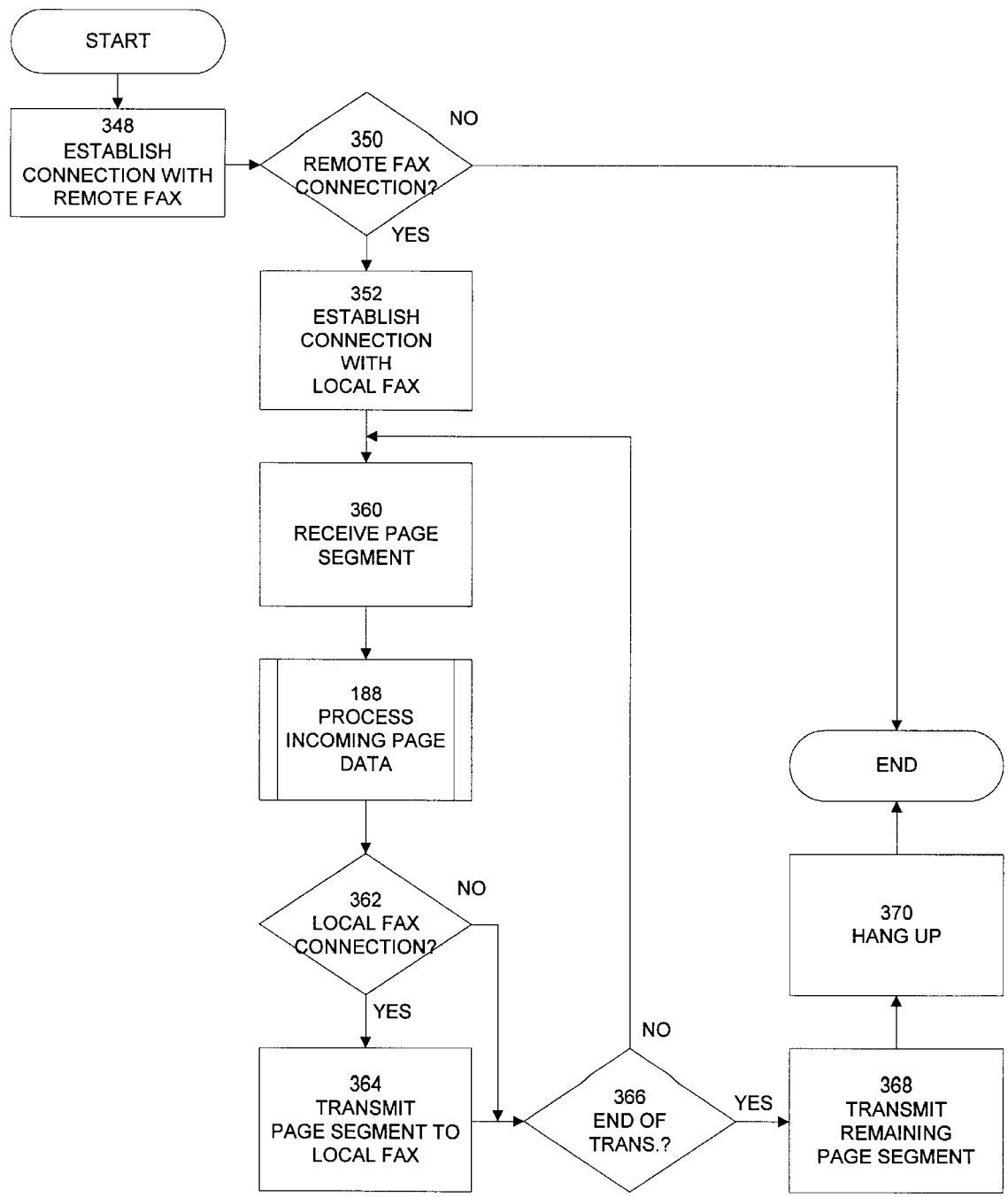
FIG. 22 is a flow diagram for a preferred method of processing an incoming fax in simultaneous modify mode in accordance with the present invention.

Referring now to FIG. 22, there is shown a flow diagram for a preferred method of processing an incoming fax in simultaneous modify mode in accordance with the present invention. Processing begins by establishing 348 a connection with the remote fax machine. This is accomplished by following the same steps (174–187) used in "store and forward" mode, as illustrated in FIG. 11. However, the step of receiving the page data is deferred until later, e.g., after a connection is established with the local fax machine 14. A check 350 is made as to whether a connection has been established with the remote fax machine. If the answer is "no," then the routine terminates; otherwise, processing continues by establishing 230 a connection with the local fax machine 14. As above, this is accomplished by following the same steps (214–220) used in "store and forward" mode, as illustrated in FIG. 13.

Processing continues by receiving 360 a segment of page data. The segment could range in size between a few lines to an entire page. One skilled in the art will recognize the optimal segment size will depend on a number of factors, most notably, the transmission speed. Next, the Process Incoming Page Data routine 190 is executed as detailed with reference to FIG. 12 in order selectively decrypt and/or decompress the fax data. A check 362 is then made whether the local fax connection has been established. If the answer is "yes," automatic capture device 10 transmits 364 the segment of page data to the local fax machine 114; otherwise, control transfers to step 366, and automatic capture device 10 operates as though it were in "store and forward mode," buffering the page data for subsequent forwarding to the local fax machine 14. A check 366 is made whether the end of transmission indicator has been received from the remote fax machine. If the answer is "no," then control returns to step 360; otherwise, the remainder of the buffered data is sent 368, automatic capture device 10 "hangs up" 370 on the local fax machine, and the routine ends.

Figure 23:
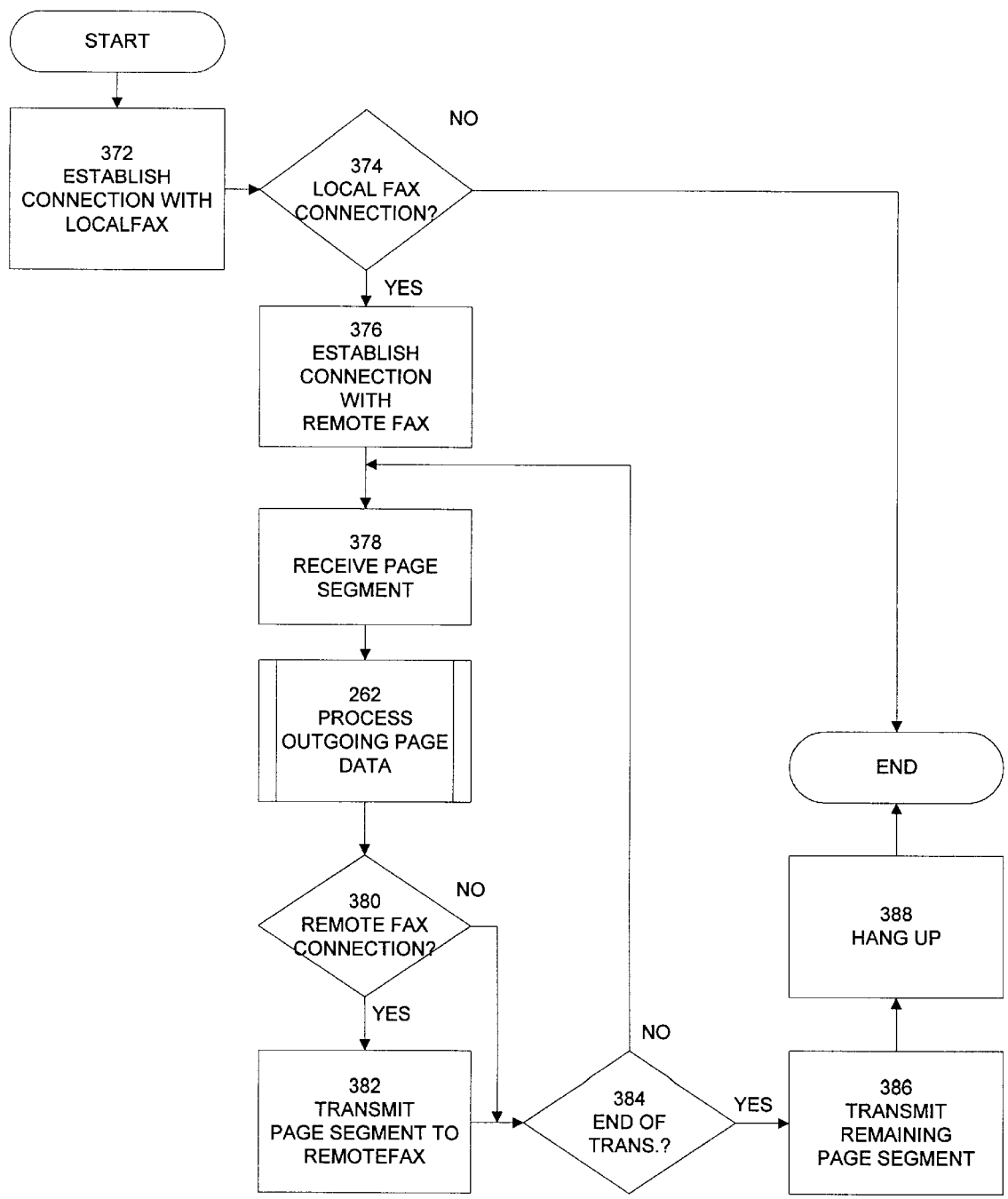
FIG. 23 is a flow diagram for a preferred method of processing an outgoing fax in simultaneous modify mode in accordance with the present invention.

Referring now to FIG. 23, there is shown a flow diagram for a preferred method of processing an outgoing fax in simultaneous modify mode in accordance with the present invention. Processing begins by establishing 372 a connection with the local fax machine. This is accomplished by following the same steps (214–220) used in "store and forward" mode, as illustrated in FIG. 13. However, the step of receiving the page data is deferred until later, e.g., after a connection is established with the remote fax machine. A check 374 is made as to whether a connection has been established with the local fax machine. If the answer is "no," then the routine terminates; otherwise, processing continues by establishing 376 a connection with the remote fax machine. As above, this is accomplished by following the same steps (174–187) used in "store and forward" mode, as illustrated in FIG. 11.

Processing continues by receiving 378 a segment of page data. The segment could range in size between a few lines to an entire page. One skilled in the art will recognize the optimal segment size will depend on a number of factors, most notably, the transmission speed. Next, the Process Outgoing Page Data routine 262 is executed as detailed with reference to FIG. 14 in order selectively encrypt or compress the fax data. A check 380 is made whether the remote fax connection has been established. If the answer is "yes," automatic capture device 10 transmits 382 the segment of page data to the remote fax machine; otherwise, control transfers to step 384, and automatic capture device 10 operates as though it were in "store and forward mode," buffering the page data for subsequent forwarding to the remote fax machine. A check 384 is made whether the end of transmission indicator has been received from the local fax machine. If the answer is "no," then control returns to step 378; otherwise, the remainder of the buffered data is sent 386, automatic capture device 10 "hangs up" 388 on the local fax machine, and the routine ends.

While the present invention has been described with reference to certain preferred embodiments, those skilled in the art will recognize that various modifications may be provided. Variations upon and modifications to the preferred embodiments are provided for by the present invention, which is limited only by the following claims.

What is claimed is:

1. A facsimile apparatus comprising:
   circuitry for sensing and demodulating a facsimile signal on a telephone line; and
   a dynamically reconfigurable processor, coupled to the sensing and demodulating circuitry, for receiving and selectively modifying the facsimile signal, the dynamically reconfigurable processor comprising:
      a reconfigurable logic unit; and
      a memory, coupled to the reconfigurable logic unit, storing:
         a plurality of configuration sets, each configuration set specifying a configuration of the reconfigurable logic unit, each configuration defining an instruction set architecture of the dynamically reconfigurable processor; and
         a plurality of instructions to be executed by the reconfigurable logic unit in response to a timing signal, at least one instruction comprising a reconfiguration instruction for reconfiguring the reconfigurable logic unit with one of the configuration sets, at least one reconfiguration instruction executed in response to sensing the facsimile signal on the telephone line.

2. The apparatus of claim 1, further comprising:
   a communications interface, coupled to the dynamically reconfigurable processor, for transmitting the facsimile signal to a storage unit, wherein at least one instruction set architecture includes instructions optimized for transmitting the facsimile signal to the storage unit.

3. The apparatus of claim 2, further comprising:
   a storage unit, coupled to the communications interface, for receiving and storing a representation of the facsimile signal.

4. The apparatus of claim 1, wherein the circuitry for sensing and demodulating the facsimile signal comprises:
   a transformer, coupled to the telephone line, having a high impedance for diverting at least a portion of the facsimile signal from the telephone line; and
   a codec, coupled to the transformer and the dynamically reconfigurable processor, for demodulating the diverted signal and providing the demodulated signal to the dynamically reconfigurable processor.

5. The apparatus of claim 4, further comprising:
   an amplifier, coupled between the transformer and the codec, for amplifying the diverted signal.

6. The apparatus of claim 1, wherein the reconfigurable logic unit is a programmable gate array.

7. The apparatus of claim 1, wherein the memory is a flash-programmable read-only memory device.

8. The apparatus of claim 1, wherein the dynamically reconfigurable processor further comprises:
   a page buffer, coupled to the reconfigurable logic unit, for temporarily storing a representation of the facsimile signal received by the dynamically reconfigurable processor.

9. The apparatus of claim 1, wherein the reconfigurable logic unit is adapted to provide at least one instruction set architecture optimized for receiving the facsimile signal and at least one instruction set architecture optimized for selectively modifying the facsimile signal.

10. The apparatus of claim 9, wherein the instruction set architecture optimized for selectively modifying the facsimile signal comprises instructions optimized for encrypting the facsimile signal.

11. The apparatus of claim 9, wherein the instruction set architecture optimized for selectively modifying the facsimile signal comprises instructions optimized for decrypting the facsimile signal.

12. The apparatus of claim 9, wherein the instruction set architecture optimized for selectively modifying the facsimile signal comprises instructions optimized for compressing the facsimile signal.

13. The apparatus of claim 9, wherein the instruction set architecture optimized for selectively modifying the facsimile signal comprises instructions optimized for decompressing the facsimile signal.

14. The apparatus of claim 9, wherein the instruction set architecture optimized for receiving the facsimile signal comprises instructions optimized for controlling the circuitry for sensing and demodulating the facsimile signal.

15. The apparatus of claim 1, further comprising:
   circuitry, coupled to the dynamically reconfigurable processor and the telephone line, for modulating and sending a facsimile signal via the telephone line.

16. The apparatus of claim 15, wherein the circuitry for modulating and sending a facsimile signal comprises:
   a codec, coupled to the dynamically reconfigurable processor, for modulating a facsimile signal; and
   a transformer, coupled to the codec and the telephone line, having a low impedance for receiving the modulated signal from the codec and producing a facsimile signal on the telephone line.

17. The apparatus of claim 1, further comprising:
   a ring detector, coupled to the telephone line and the dynamically reconfigurable processor, for detecting a ring signal on the telephone line, wherein the reconfigurable logic unit is reconfigured in response to detecting the ring signal to provide an instruction set architecture optimized for receiving the facsimile signal.

18. The apparatus of claim 1, further comprising:
   a load detector, coupled to the telephone line and the dynamically reconfigurable processor, for detecting a line current on the telephone line, wherein the reconfigurable logic unit is reconfigured in response to detecting the line current to provide an instruction set architecture optimized for receiving the facsimile signal.

19. The apparatus of claim 1, wherein the telephone line extends between first and second facsimile machines, the apparatus further comprising:
   a switch, coupled to the telephone line and the dynamically reconfigurable processor, for disconnecting the first facsimile machine from the telephone line such that the dynamically reconfigurable processor may intercept a facsimile signal from, or send a facsimile signal to, the second facsimile machine.

20. In a facsimile apparatus for receiving and selectively modifying a facsimile signal on a telephone line, the apparatus comprising a dynamically reconfigurable processor, the dynamically reconfigurable processor comprising a reconfigurable logic unit and a memory, the memory comprising a plurality of configuration sets, each configuration set specifying a configuration of the reconfigurable logic unit, each configuration defining an instruction set architecture, the memory further comprising a plurality of instructions, at least one instruction comprising a reconfiguration instruction for reconfiguring the reconfigurable logic unit with one of the configuration sets, a method for receiving and selectively modifying the facsimile signal comprising:

sensing the facsimile signal on the telephone line;

in response to sensing the facsimile signal, reconfiguring the reconfigurable processing unit to an instruction set architecture optimized for receiving the facsimile signal; and receiving the facsimile signal.

21. The method of claim 20, wherein the telephone line extends between first and second facsimile machines, the sensing step comprising:

determining which of the first and second facsimile machines is generating the facsimile signal; and disconnecting from the telephone line the facsimile machine that is not generating the facsimile signal.

22. The method of claim 20, further comprising:

temporarily storing a representation of the facsimile signal in a page buffer.

23. The method of claim 20, further comprising:

determining whether the facsimile signal is encrypted;

in response to the facsimile signal being encrypted, reconfiguring the reconfigurable processing unit to an instruction set architecture optimized for decrypting the facsimile signal; and decrypting the facsimile signal.

24. The method of claim 20, further comprising:

determining whether the facsimile signal is compressed;

in response to the facsimile being compressed, reconfiguring the reconfigurable processing unit to an instruction set architecture optimized for decompressing the facsimile signal; and decompressing the facsimile signal.

25. The method of claim 20, further comprising:

detecting a format of the facsimile signal;

reconfiguring the reconfigurable processing unit to an instruction set architecture optimized for receiving the facsimile signal in the detected format; and receiving the facsimile signal in the detected format.

26. The method of claim 20, further comprising:

in response to receiving the facsimile signal, reconfiguring the reconfigurable processing unit to an instruction set architecture optimized for transmitting the facsimile signal to a storage unit; and transmnitting the facsimile signal to the storage unit.

* * * * *